US011401382B2

(12) United States Patent
Schoemer et al.

(10) Patent No.: US 11,401,382 B2
(45) Date of Patent: Aug. 2, 2022

(54) THERMOPLASTIC POLYAMIDE PARTICLES

(71) Applicant: BASF SE, Ludwigshafen (DE)

(72) Inventors: Martina Schoemer, Ludwigshafen (DE); Jean-Pierre Berkan Lindner, Ludwigshafen (DE); Simon Kniesel, Ludwigshafen (DE); Juergen Wiethan, Grenzach-Wyhlen (DE)

(73) Assignee: BASF SE, Ludwigshafen (DE)

( * ) Notice: Subject to any disclaimer, the term of this patent is extended or adjusted under 35 U.S.C. 154(b) by 867 days.

(21) Appl. No.: 16/095,465

(22) PCT Filed: Apr. 25, 2017

(86) PCT No.: PCT/EP2017/059726
§ 371 (c)(1),
(2) Date: Oct. 22, 2018

(87) PCT Pub. No.: WO2017/186677
PCT Pub. Date: Nov. 2, 2017

(65) Prior Publication Data
US 2019/0127527 A1 May 2, 2019

(30) Foreign Application Priority Data
Apr. 26, 2016 (EP) .................... 16166968

(51) Int. Cl.
*C08L 77/00* (2006.01)
*C08G 73/06* (2006.01)
*C11D 3/37* (2006.01)
*C11D 11/00* (2006.01)
*C08K 3/22* (2006.01)
*C08K 3/30* (2006.01)
*C08L 79/04* (2006.01)
*C08K 3/013* (2018.01)

(52) U.S. Cl.
CPC ............ *C08G 73/0616* (2013.01); *C08K 3/22* (2013.01); *C08K 3/30* (2013.01); *C08L 77/00* (2013.01); *C11D 3/3719* (2013.01); *C11D 11/0017* (2013.01); *C08K 3/013* (2018.01); *C08K 2003/2227* (2013.01); *C08K 2003/2241* (2013.01); *C08K 2003/3036* (2013.01); *C08K 2003/3045* (2013.01); *C08L 79/04* (2013.01)

(58) Field of Classification Search
CPC ........ C08G 73/0616; C08K 3/22; C08K 3/30; C08L 77/00; C11D 3/3719; C11D 11/0017
See application file for complete search history.

(56) References Cited

U.S. PATENT DOCUMENTS

| 4,360,617 A | 11/1982 | Muller et al. |
| 6,416,770 B1 | 7/2002 | Leduc et al. |
| 2009/0035365 A1* | 2/2009 | Popplewell .......... C11D 3/1213 424/451 |

FOREIGN PATENT DOCUMENTS

| DE | 10313681 A1 | 10/2004 |
| EP | 129195 A2 | 12/1984 |
| EP | 129196 A2 | 12/1984 |
| EP | 594329 A1 | 4/1994 |
| EP | 922065 A2 | 6/1999 |
| EP | 1198491 A1 | 4/2002 |
| KR | 2013-0039724 A | 4/2013 |
| WO | WO-2004/080679 A1 | 9/2004 |
| WO | WO-2007/18962 A2 | 2/2007 |
| WO | WO-2010/072571 A1 | 7/2010 |
| WO | WO-2010/128337 A2 | 11/2010 |
| WO | WO-2011/064581 A1 | 6/2011 |
| WO | WO-2011/098815 A1 | 8/2011 |
| WO | WO-2012/035342 A1 | 3/2012 |
| WO | WO-2012/035343 A1 | 3/2012 |
| WO | WO-2012/056252 A2 | 5/2012 |
| WO | WO-2012/095677 A2 | 7/2012 |
| WO | WO-2012/127009 A1 | 9/2012 |
| WO | WO-2015/004444 A1 | 1/2015 |
| WO | WO-2016/087351 A1 | 6/2016 |

OTHER PUBLICATIONS

International Application No. PCT/EP2017/059726, International Search Report and Written Opinion, dated Jul. 19, 2017.
International Application No. PCT/EP2017/059726, International Preliminary Report on Patentability (Chapter II), dated Jul. 19, 2018.

\* cited by examiner

*Primary Examiner* — Peter D. Mulcahy
(74) *Attorney, Agent, or Firm* — Marshall, Gerstein & Borun LLP

(57) ABSTRACT

Thermoplastic polyamide particles comprising at least one polyamide and at least one polymeric ionic compound comprising imidazolium groups (imidazolium compound), the thermoplastic polyamide particles having an ellipsoidal or approximately ellipsoidal shape with the largest diameter of 1 to 100 mm, preferably 2 to 10 mm, more preferably 3 to 8 mm.

15 Claims, No Drawings

THERMOPLASTIC POLYAMIDE PARTICLES

CROSS-REFERENCE TO RELATED APPLICATIONS

This is the U.S. national phase of International Application No. PCT/EP2014/059726, filed Apr. 25, 2017, which claims the benefit of European Patent Application No. 16166968.4, filed Apr. 26, 2016.

The invention relates to thermoplastic polyamide particles, to methods for producing them, and to their use in laundering processes.

The use of polyamide particles in the cleaning of textiles is per se known. WO 2012/056252 relates to an improved laundering and cleaning process wherein textiles are treated with water and with polymer particles which have a cylindrical or spherical shape and have an average density in the range from 0.5 to 2.5 g/cm$^3$ and an average volume in the range from 5 to 275 mm$^3$. The washing drum that it used for the laundering has perforated side walls and is rotated at a speed such as to result in g-forces in the range from 0.05 to 900 g. Polymer particles described as suitable are foamed or unfoamed particles based on polyalkenes such as polyethylene and polypropylene, polyamides, polyesters, or polyurethanes. Indicated as being particularly preferred are nylon, polyethylene terephthalate and polybutylene terephthalate. Exemplary polyamide particles with cylindrical or spherical shape have densities of 1.10 to 1.16 g/cm$^3$. Spherical nylon-6,6 particles with densities in the range from 1.16 to 1.88 g/cm$^3$ are described as well, in table 7, though without indication as to how the density of the particles may be brought about. It is further stated that both the particle density and the particle size affect the recovery of the particles after the laundering operation.

When polyamide particles are used in the cleaning of textiles, there is both a color scavenger effect and also a significant support to the laundering effect. The objective of a laundering and cleaning process using polyamide particles is to reduce the levels of water, energy, and detergents employed, while at the same time achieving an improved laundering effect. The circumstances of the procedure, such as uncomplicated and complete removal of the polyamide pellets, a comparable washing cycle time, and the price of the washing machine, ought to offer the end user an attractive alternative to the conventional laundering procedure. The laundering effect is influenced by numerous factors, such as operating temperature, detergent formulation, cycle time, and particle characteristics.

For the known polymer particles, their removal after the end of the laundering operation is capable of further improvement. Moreover, they ought not to be abrasive, in order to treat textiles gently. Furthermore, the known polymer particles are often stored in a wet environment at room temperature or increased temperature. This may lead to the formation of mold or fungi on the surface of the polymer particles or in general to a contamination of the particles with bacteria or fungi.

Different antimicrobial agents are known which can be added to polymers, for example silver or silver compounds. The disadvantage of silver additives is that they are activated by migration and moisture only and are leaching out when in prolonged contact with water.

It is an object of the present invention to provide polymer particles for use in the above laundering process that are resistant to bacteria and fungi and in which the bacteria and fungi resistance additive does not leach out.

It is a further object of the present invention to provide polymer particles for use in the above laundering process that are readily removable from the laundry and/or wash liquor and that do not act abrasively to textiles.

According to a further object of the present invention, the laundering effect of the polymer particles is to be improved.

The last two objects can be expressed in a generalized form as the provision of thermoplastic polyamide particles which exhibit improved laundering properties in comparison to the prior art.

The objects are achieved in accordance with the invention by means of thermoplastic polyamide particles comprising at least one polyamide and at least one polymeric ionic compound comprising imidazolium groups (imidazolium compound), the thermoplastic polyamide particles having an ellipsoidal or approximately ellipsoidal shape with the largest diameter of 1 to 100 mm, preferably 2 to 10 mm, more preferably 3 to 8 mm.

Polymeric ionic compounds comprising imidazolium groups are known per se, e. g. from the following references which describe polymeric ionic compounds comprising imidazolium groups (imidazolium compounds) which can be employed according to the present invention:

WO 2010/072571 A1 discloses methods for producing polymeric, ionic imidazolium compounds in which an α-dicarbonyl compound, an aldehyde, at least one amino compound having at least two primary amino groups, and a protic acid are reacted with each other. The polymeric, ionic imidazolium compounds are disclosed as well.

The use of these polymeric imidazolium compounds as biocides is disclosed in WO 2012/127009. It is disclosed that these biocides can be added inter alia to thermoplastic polymers, e. g. polyamides. The examples disclosed, however, relate to cosmetic applications of the polymeric imidazolium compounds.

EP-A-0 594 329 A1 discloses antimicrobial agents comprising polyquaternary ammonium compounds. They are described as being useful as antimicrobial agents, especially against fungi and bacteria.

U.S. Pat. No. 6,416,770 B1 discloses the use of heterocyclic quaternary polyammonium polymers as protective agent for keratin fibres and cosmetic compositions. This reference discloses the manufacture of polymeric imidazolium compounds.

The polymeric imidazolium compounds disclosed in the above references can be employed in the thermoplastic polyamide particles of the present invention.

Polyamide particles not containing imidazolium compounds which can be employed according to the present invention are described in non-(pre)published PCT/EP2015/078025 filed on Nov. 30, 2015.

According to the present invention it has been found that polymeric imidazolium compounds are especially useful and active in thermoplastic polyamide particles having an ellipsoidal or approximately ellipsoidal shape with the largest diameter of 1 to 100 mm, preferably 2 to 10 mm, more preferably 3 to 8 mm, which are preferably employed in laundry washing processes. The polymeric imidazolium compounds show a superior antimicrobial activity in the thermoplastic polyamide particles and at the same time show no significant leaching when stored in a humid or aqueous environment for a prolonged period of time.

The polymeric imidazolium compounds exhibiting a superior antimicrobial activity can be permanently admixed with the polymer matrix by compounding. Due to the polymeric nature of the imidazolium compounds they show a reduced migration behavior in the polymer matrix. Furthermore, the high thermal stability of the polymeric imidazolium compounds makes it possible to admix them with polyamides by compounding above the melting point of the polyamide.

The thermoplastic polyamide particles according to the present invention may or may not contain at least one particulate inorganic filler having a density of at least 2.5 g/cm³. Preferably, the thermoplastic polyamide particles according to the present invention comprise at least one particulate inorganic filler having a density of at least 2.5 g/cm³, the thermoplastic polyamide particles (including the particulate inorganic filler and the polymeric imidazolium compound) having a density of at least 1.65 g/cm³, preferably of at least 1.9 g/cm³.

Furthermore, it has been found in accordance with the invention that thermoplastic polyamide particles containing the polymeric imidazolium compounds, which have a density of at least 1.65 g/cm³, preferably at least 1.9 g/cm³, and which have an ellipsoidal or approximately ellipsoidal shape with a largest diameter of 1 to 100 mm, preferably 2 to 10 mm, more preferably 3 to 8 mm, for example 3 to 6 mm, are easily removed after the end of the laundering operation and, moreover, do not act abrasively on the textiles to be laundered, since they do not have any sharp edges.

The object is also achieved by a method for producing such thermoplastic polyamide particles by compounding, preferably extruding the ingredients and subsequently shaping, the shaping preferably being a pelletizing, more particularly an underwater pelletizing.

The object is also achieved through the use of the above thermoplastic polyamide particles in laundering processes, preferably wherein unclean textiles are cleaned by agitating the textiles in the presence of a cleaning composition comprising the polyamide particles and a liquid medium.

Without wishing to be limited by any particular theory it is believed that the preferred cleaning particles with a higher density separate better from the cleaned substrate at the end of the cleaning procedure and that using a dense filler achieves this very effectively whilst still permitting the use of low density nylon thermoplastics which offer excellent cleaning characteristics and recyclability.

The word textile as used herein preferably means a woven material comprising fibres, typically fibres which are twisted into a yarn.

The substrate may be in the form of, for example, towels, clothes, sheets, footwear or bags. Examples of suitable clothes include shirts, trousers, skirts, coats, socks, jumpers and the like. The textile can be made from fibres of any suitable material; preferably the textile is or comprises one or more fibres made of wool, cellulose, silk, nylon, polyester or acrylic. The substrate is preferably soiled. Examples of soil contaminants include: body fluids and body products (e.g. blood, sweat, grime, sebum), grass, food (e.g. egg, chocolate, curry, wine, flour, tomato), drink (especially fruit juices, coffee and tea), mud, ink (e.g. from pens and felt tips), cosmetics (makeup) and oils (e.g. motor oil).

The thermoplastic polyamide particles of the invention have an ellipsoidal or approximately ellipsoidal shape with a largest diameter of preferably 2 to 10 mm, more preferably 3 to 8 mm.

An ellipsoid is understood in accordance with the invention to be a three-dimensional analog of an ellipse, which in the three-dimensional space can be explained as a stretched or compressed (affine) image of a spherical surface (sphere). With use of Cartesian coordinates and orientation of the coordinate axes x, y and z in accordance with the axes of symmetry of the ellipsoid, its equation may be $(x^2/a^2)+(y^2/b^2)+(z^2/c^2)-1=0$, with the positive real numbers a, b, and c corresponding to the lengths of the semiaxes. For different lengths of the semiaxes there are four distinct cases between which differentiation may be made:

a>b>c leads to a triaxial ellipsoid.
a=b>c leads to a flattened ellipsoid.
a=b<c leads to an extended or stretched ellipsoid.
a=b=c leads to a spherical form.

If two of the semiaxes have the same length, the corresponding ellipsoid spanned by these two semiaxes has a circular cross section.

Ellipsoids of the invention are distinguished by the absence of sharp edges; instead, the ellipsoid is rounded off on all sides.

In the ellipsoid of the invention, the lengths of the semiaxes a, b, and c may be selected freely, and they may therefore represent true ellipsoids or else spherical shapes. Semiaxes a, b, and c of different lengths may result in different diameters. In accordance with the invention, the ellipsoids or thermoplastic polyamide particles have a largest diameter of 3 to 8 mm, preferably 4 to 7 mm. The largest diameter here is typically twice the longest semiaxis of the ellipsoid. The largest diameter therefore refers to an imaginary axis through the center point of the ellipsoid, said axis having the greatest length.

An approximately ellipsoidal shape in accordance with the invention is a shape which deviates from the shape of an ideal ellipsoid as a result, for example, of protrusions and indentations in the surface of the ellipsoid. Corresponding protrusions and intrusions of the ellipsoid, and also curvatures of the ellipsoid, lead to altered diameters of the ellipsoid at these points. In accordance with the invention, an approximately ellipsoidal shape is characterized by the diameter of the ellipsoid at any, arbitrarily selected position of the ellipsoid deviating by not more than 20%, preferably not more than 10%, more particularly not more than 5% from the corresponding diameter of an ideal ellipsoid.

In the course of the production of the thermoplastic polyamide particles, particularly at the pelletizing stage, there are frequently certain scatterings in the lengths of the semiaxes of the resultant ellipsoids. Very substantially identical ellipsoids are obtained typically by shaping methods in which the thermoplastic polyamide is compression molded, injection molded, or cast into a shape.

In the course of the inventively preferred shaping by extrusion of the ingredients and subsequent shaping by pelletizing, preferably underwater pelletizing, there is a certain scatter of the ellipsoid shapes and deviations from the ideal shape.

Particularly preferred ellipsoids are those which deviate from a spherical shape.

The particles preferably have an aspect ratio, in order of increasing preference, of less than 1.5, 1.4, 1.3, 1.28, 1.25, 1.22, 1.20, 1.17, 1.15 and 1.12. Of course, the lowest possible aspect ratio is 1.0. These ratios correspond to a shape which is more smooth and ellipsoidal/spherical and which separates better at the end of the wash cycle. The aspect ratio is calculated by measuring the largest and the smallest linear dimensions for each particle. From this an aspect ratio for each particle can be calculated and the number average of many particles can then be taken. The preferred method for measuring the particle largest and smallest linear dimension is by using a vernier caliper.

Preferably, the number average size or aspect ratio of the cleaning particles are the result of measurements from at least 10, more preferably at least 20 and most preferably at least 30 cleaning particles.

The aspect ratio for particles of the invention is most preferably below 1.2.

The (approximately) ellipsoidal shape and the aspect ratio can be determined visually or preferably by an optical/digital imaging method in which e. g. one or more digital images of the particles or their shadows are analyzed, for example automatically or computer-based. For example, a camsizer (Retsch Technology) may be employed which employs two CCD-cameras and stroboscopic light for a dynamic image analysis of the shadows that the particles project on a screen.

The thermoplastic polyamide particles of the invention comprise at least one polyamide. This polyamide may be selected arbitrarily.

Polyamides are understood to be homopolymers or copolymers of synthetic, long-chain polyamides, which as an essential constituent have amide groups repeatingly in the main polymer chain. Examples of such polyamides are nylon-6 (polycaprolactam), nylon-6,6 (polyhexamethyleneadipamide), nylon-4,6 (polytetramethyleneadipamide), nylon-5,10 (polypentamethyleneadipamide), nylon-6,10 (polyhexamethylenesebacamide), nylon-7 (polyenantholactam), nylon-11 (polyundecanolactam), and nylon-12 (polydodecanolactam). These polyamides carry the generic name nylon.

Polyamides can be produced in principle by two methods.

In the polymerization from dicarboxylic acids and diamines, as in the polymerization from amino acids, the amino and carboxyl end groups of the starting monomers or starting oligomers react with one another to form an amide group and water. The water can be subsequently removed from the polymer composition. In the case of the polymerization from carboxamides, the amino and amide end groups of the starting monomers or starring oligomers react with one another to form an amide group and ammonia. The ammonia may be subsequently removed from the polymer composition.

Examples of suitable starting monomers or starting oligomers for the production of polyamides are as follows:
(1) $C_2$ to $C_{20}$, preferably $C_3$ to $C_{18}$ amino acids, such as 6-aminocaproic acid, 11-aminoundecanoic acid, and also the dimers, trimers, tetramers, pentamers, or hexamers thereof,
(2) $C_2$ to $C_{20}$ amino acid amides, such as 6-aminocaproamide, 11-aminoundecanamide, and the dimers, trimers, tetramers, pentamers, or hexamers thereof,
(3) reaction products of
  (3a) $C_2$ to $C_{20}$, preferably $C_2$ to $C_{12}$ alkylenediamines, such as tetramethylenediamine or preferably hexamethylenediamine, with
  (3b) a $C_2$ to $C_{20}$, preferably 02 to 014 aliphatic dicarboxylic acid, such as sebacic acid, decanedicarboxylic acid, or adipic acid, and also the dimers, trimers, tetramers, pentamers, or hexamers thereof,
(4) reaction products of (3a), with
  (4b) a $C_8$ to $C_{20}$, preferably $C_8$ to $C_{12}$ aromatic dicarboxylic acid or derivatives thereof, as for example chlorides, such as 2,6-naphthalenedicarboxylic acid, preferably isophthalic acid or terephthalic acid, and also the dimers, trimers, tetramers, pentamers, or hexamers thereof,
(5) reaction products of (3a), with
  (5b) a $C_9$ to $C_{20}$, preferably $C_9$ to $C_{18}$ arylaliphatic dicarboxylic acid or derivatives thereof, as for example chlorides, such as o-, m-, or p-phenylenediacetic acid, and also the dimers, trimers, tetramers, pentamers, or hexamers thereof,
(6) reaction products of
  (6a) $C_6$ to $C_{20}$, preferably $C_6$ to $C_{10}$ aromatic diamines, such as m- or p-phenylenediamine, with (3b) and also the dimers, trimers, tetramers, pentamers, or hexamers thereof,
(7) reaction products of
  (7a) $C_7$ to $C_{20}$, preferably $C_8$ to $C_{18}$ arylaliphatic diamines, such as m- or p-xylylenediamine, with (3b) and also the dimers, trimers, tetramers, pentamers, or hexamers thereof,
(8) monomers or oligomers of a $C_2$ to $C_{20}$, preferably $C_2$ to $C_{18}$ arylaliphatic or preferably aliphatic lactam, such as enantholactam, undecanolactam, dodecanolactam, or caprolactam, and also homopolymers, copolymers, or mixtures of such starting monomers or starting oligomers.

Preference here is given to those starting monomers or starting oligomers which on polymerization lead to the polyamides nylon-6, nylon-6,6, nylon-4,6, nylon-5,10, nylon-6,10, nylon-7, nylon-11, nylon-12, more particularly to nylon-6 and nylon-6,6.

Mention may also be made, moreover, of polyamides which are obtainable, for example, by condensation of 1,4-diaminobutane with adipic acid at elevated temperature (nylon-4,6). Production processes for polyamides with this structure are described in EP-A 38 094, EP-A 38 582, and EP-A 39 524, for example.

The preparation of the polyamides is conventional or may take place in accordance with processes that are known per se. Thus the polymerization or polycondensation of the starting monomers may be performed under customary process conditions, and the reaction may take place continuously or discontinuously.

Also possible is the use of polyamides which have been prepared by copolycondensation of two or more of the abovementioned monomers or their components, examples being copolymers of adipic acid, isophthalic acid or terephthalic acid, and hexamethylenediamine, or copolymers of caprolactam, terephthalic acid, and hexamethylenediamine. Partially aromatic copolyamides of these kinds contain 40 to 90 wt. % of units deriving from terephthalic acid and hexamethylenediamine. A small fraction of the terephthalic acid, preferably not more than 10 wt. % of the total aromatic dicarboxylic acids employed, may be replaced by isophthalic acid or by other aromatic dicarboxylic acids, preferably those in which the carboxyl groups are in para-position.

One partly aromatic polyamide is nylon-9T, which derives from nonanediamine and terephthalic acid.

As monomers it is also possible to contemplate cyclic diamines such as those of the general formula

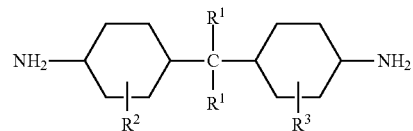

in which
$R^1$ is hydrogen or a $C_1$-$C_4$ alkyl group,
$R^2$ is a $C_1$-$C_4$ alkyl group or hydrogen, and
$R^3$ is a $C_1$-$C_4$ alkyl group or hydrogen.

Particularly preferred such diamines are bis(4-aminocyclohexyl)methane, bis(4-amino-3-methylcyclohexyl)methane, 2,2-bis(4-aminocyclohexyl)propane, or 2,2-bis(4-amino-3-methylcyclohexyl)propane. Further such diamines include 1,3- or 1,4-cyclohexanediamine or isophoronediamine. As well as the units deriving from terephthalic acid and hexamethylenediamine, the partly aromatic copolyamides include units which derive from ε-caprolactam and/or units which derive from adipic acid and hexamethylenediamine.

The fraction of units which derive from ε-caprolactam is up to 50 wt. %, preferably 20 to 50 wt. %, more particularly 25 to 40 wt. %, while the fraction of units which derive from adipic acid and hexamethylenediamine is up to 60 wt. %, preferably 30 to 60 wt. %, and more particularly 35 to 55 wt. %.

The copolyamides may also comprise units of ε-caprolactam and units of adipic acid and hexamethylenediamine; in this case it should be ensured that the fraction of units which are free from aromatic groups is at least 10 wt. %, preferably at least 20 wt. %. The ratio of the units deriving from ε-caprolactam to the units deriving from adipic acid and hexamethylenediamine is not subject to any particular restriction here.

The partly aromatic copolyamides may be prepared, for example, by the process described in EP-A-129 195 and EP-A-129 196.

The following, nonconclusive schedule comprises the polyamides mentioned and also further polyamides within the meaning of the invention, and the monomers comprised.
AB polymers:
PA 4 pyrrolidone
PA 6 ε-caprolactam
PA 7 ethanolactam
PA 8 caprylolactam
PA 9 9-aminopelargonic acid
PA 11 11-aminoundecanoic acid
PA 12 laurolactam
AA/BB polymers
PA 46 tetramethylenediamine, adipic acid
PA 66 hexamethylenediamine, adipic acid
PA 69 hexamethylenediamine, azelaic acid
PA 610 hexamethylenediamine, sebacic acid
PA 612 hexamethylenediamine, decanedicarboxylic acid
PA 613 hexamethylenediamine, undecanedicarboxylic acid
PA 1212 1,12-dodecanediamine, decanedicarboxylic acid
PA 1313 1,13-diaminotridecane, undecanedicarboxylic acid
PA 6T hexamethylenediamine, terephthalic acid
PA 9T 1,9-nonanediamine, terephthalic acid
PA MXD6 m-xylylenediamine, adipic acid
PA 6I hexamethylenediamine, isophthalic acid
PA 6-3-T trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 diaminodicyclohexylmethane, laurolactam
PA 6I/6T/PACM as PA 6I/6T+diaminodicyclohexylmethane
PA 12/MACMI laurolactam, dimethyldiaminodicyclohexylmethane isophthalic acid
PA 12/MACMT laurolactam, dimethyldiaminodicyclohexylmethane, terephthalic acid
PA PDA-T phenylenediamine, terephthalic acid Particularly preferred in accordance with the invention is the use of aliphatic polyamides. In this context, mixtures of aliphatic polyamides may also be used.

With particular preference the at least one polyamide is nylon-6, nylon-6,6, or a blend or copolymer of these polyamides.

Preferred polyamides are therefore polyhexamethyleneadipamide, polyhexamethylenesebacamide, and polycaprolactam, and also copolyamides 6/66, more particularly with a fraction of 5 to 95 wt. % of caprolactam units (e.g., Ultramid® C33 from BASF SE). Additionally suitable polyamides are obtainable from ω-aminoalkylnitriles such as, for example, aminocapronitrile (PA 6) and adiponitrile with hexamethylenediamine (PA 66) by means of what is known as direct polymerization in the presence of water, as described in DE-A 10313681, EP-A 1198491, and EP 922065.

The polyamides used in accordance with the invention preferably have a viscosity number in the range from 90 to 350 ml/g, more preferably from 110 to 240 ml/g, measured in accordance with ISO 307.

In the preferred thermoplastic polyamide particles of the invention, this polyamide is preferably combined with at least one particulate inorganic filler, which has a density of at least 2.5 g/cm$^3$, preferably at least 4 g/cm$^3$. The upper limit for the density is preferably 20 g/cm$^3$, more preferably 10 g/cm$^3$.

Particulate inorganic fillers which may be used are any suitable materials which have the density according to the invention and which do not give the thermoplastic polyamide particles any disadvantageous properties or lead to properties which adversely affect the laundering process using the thermoplastic polyamide particles. Under production and application conditions, the behavior of the particulate inorganic fillers ought to be inert.

The particulate inorganic filler material preferably is or comprises one or more fillers selected from a metal salt, a metal oxide, a metal carbide, a metal nitride, a ceramic, a metal, an alloy and combinations thereof. The inorganic filler preferably is or comprises a metal oxide, a metal salt, a metal or an alloy, more preferably is or comprises a metal oxide or a metal salt and especially is or comprises a metal salt.

Preferred metals include barium, bismuth, chromium, cadmium, copper, cobalt, gold, iron, iridium, lead, molybdenum, nickel, osmium, palladium, platinum, silver, tungsten and tin.

Preferred alloys include bronze, brass, rose metal, steel and ferro alloys, pewter, solder, nichrome and constantan.

Preferred metal salts are in the form of nitrate, carbonate, hydrogencarbonate, hydroxide, phosphate, silicate, hydrogen phosphate, halide (especially fluoride, chloride, bromide and iodide), acetate and sulfate.

Suitable metal salts include calcium silicate (especially wollastanite), calcium carbonate (especially chalk), magnesium silicate (especially talc) and barium sulfate (either synthetic or barite). A particularly preferred metal salt is barium sulfate.

Suitable metal oxides include iron oxide (especially magnetite), bismuth oxide, titanium oxide, aluminium oxide, silicon dioxide (especially quartz).

Preferably, the inorganic filler has a Mohr's hardness of less than 8, more preferably less than 7, yet more preferably less than 6, even more preferably less than 5 and especially less than 4. For reference diamond has a Mohr hardness of 10, barium sulfate has a Mohr hardness of 3 and gypsum has a Mohr hardness of 2. The use of inorganic fillers with a relatively low Mohr's hardness helps in several respects. Firstly, the use of low hardness inorganic fillers is thought to help to prevent undesirable abrasion on the textile substrate which would tend to cause damage to the textile. In addition, the use of low hardness inorganic fillers is of assistance in hot melt mixing and extrusion of the filler with the polyamide as it reduces or prevents the tendency for the filler to abrade, wear or damage the apparatus used to mix and extrude these materials.

These fillers ought not to dissolve in water, or to do so only in minor amounts, and also not to exhibit any reaction with water. Preference is given to using metals or metal oxides or metal sulfides metal sulfates. An example of suitable metals is iron.

Examples of suitable metal oxides are $TiO_2$, $Fe_2O_3$.

The inorganic filler is preferably selected from $BaSO_4$, $TiO_2$, ZnS metals, or mixtures thereof. $BaSO_4$, ZnS or a mixture of both is employed as filler with particular preference. Of particular relevance is Lithopone. Lithopone is produced by coprecipitation of barium sulfate and zinc sulfide. Most commonly coprecipitation is effected by combining equimolar amounts of zinc sulfate and barium sulfide. This route affords a product that is 29.4 wt % ZnS and 70.6 wt % $BaSO_4$ The filler has a particle size which permits the production of ellipsoids preferably having a largest diameter of 2 to 10 mm, preferably of 3 to 5 mm with a smooth surface. The maximum diameter of the filler ought therefore to be well below the smallest diameter of the ellipsoid.

Metals may be used in the form, for example, of metal beads. Metals with high density are iron or tungsten, for example.

Metal oxides with high density are $Fe_2O_3$, $TiO_2$, for example.

When particulate inorganic fillers are employed, the amount of particulate inorganic fillers, based on the completed thermoplastic polyamide particles, is preferably 30 to 80 wt. %, more preferably 40 to 80 wt. %. The remaining fraction is accounted for by the at least one polyamide, the polymeric imidazolium compound and any other ingredients.

The sum of all ingredients of the thermoplastic polyamide particles of the present invention always adds up to 100 wt. %.

The particulate inorganic filler is preferably used in an amount such that the thermoplastic polyamide particles have a density of at least 1.4 $g/cm^3$. The upper limit for the density of the thermoplastic polyamide particles is initially not restrictive. A preferred upper limit is 4 $g/cm^3$, more preferably 3 $g/cm^3$ for the density of the thermoplastic polyamide particles.

The thermoplastic particles of the invention may comprise customary processing aids such as stabilizers, antioxidants, agents to counteract thermal decomposition and decomposition by ultraviolet light, lubricants and mold release agents, colorants such as pigments, nucleators, plasticizers, etc.

Thus the particles of the invention may comprise 0.05 to 3, preferably 0.1 to 1.5, and more particularly 0.1 to 1 wt. % of a lubricant.

Preferred are Al, alkali metal, and alkaline earth metal salts, or esters or amides, of fatty acids having 10 to 44 C atoms, preferably having 12 to 44 C atoms.

The metal ions are preferably alkaline earths, Zn, and Al, with Ca or Mg being particularly preferred.

Preferred metal salts are Ca stearate and Ca montanate, and also Al stearate.

Mixtures of different salts may also be used, in which case the mixing ratio is arbitrary.

The carboxylic acids may be monobasic or dibasic. Examples include pelargonic acid, palmitic acid, lauric acid, margarinic acid, dodecanedioic acid, behenic acid, and, with particular preference, stearic acid, capric acid, and montanic acid (mixture of fatty acids with 30 to 40 C atoms).

The aliphatic alcohols may be monohydric to tetrahydric. Examples of alcohols are n-butanol, n-octanol, stearyl alcohol, ethylene glycol, propylene glycol, neopentyl glycol, and pentaerythritol, with glycerol and pentaerythritol being preferred.

The aliphatic amines may be monofunctional to trifunctional. Examples thereof are stearylamine, ethylenediamine, propylenediamine, hexamethylenediamine, di(6-aminohexyl)amine, with ethylenediamine and hexamethylenediamine being particularly preferred. Preferred esters or amides are, correspondingly, glycerol distearate, glycerol tristearate, ethylenediamine distearate, glycerol monopalmitate, glycerol trilaurate, glycerol monobehenate, and pentaerythritol tetrastearate.

Mixtures of different esters or amides, or esters with amides in combination, may also be used, in which case the mixing ratio is arbitrary.

The particles of the invention may comprise antioxidants, such as sterically hindered phenols, for example, in amounts of 0.01 to 1, preferably of 0.05 to 0.3 wt. %.

Suitable sterically hindered phenols are in principle all compounds with a phenolic structure which on the phenolic ring have at least one sterically bulky group.

Examples of compounds contemplated are preferably those of the formula

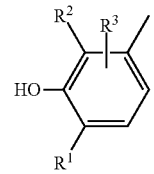

in which:
$R^1$ and $R^2$ are an alkyl group, a substituted alkyl group, or a substituted triazole group, where the radicals $R^1$ and $R^2$ may be identical or different, and $R^3$ is an alkyl group, a substituted alkyl group, an alkoxy group, or a substituted amino group.

Antioxidants of the type stated are described in DE-A 27 02 661 (U.S. Pat. No. 4,360,617), for example.

A further group of preferred sterically hindered phenols derives from substituted benzenecarboxylic acids, more particularly from substituted benzenepropionic acids.

Particularly preferred compounds from this class are compounds of the formula

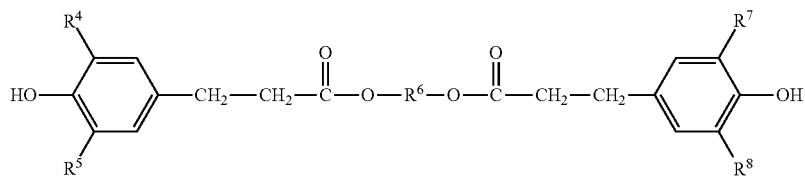

where $R^4$, $R^5$, $R^7$, and $R^8$ independently of one another are $C_1$-$C_8$ alkyl groups, which may in turn be substituted (at least one of them is a sterically bulky group), and $R^6$ is a divalent aliphatic radical having 1 to 10 C atoms, which in the main chain may also have C—O bonds.

Preferred compounds which conform to this formula are

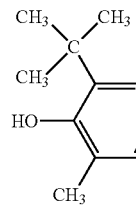 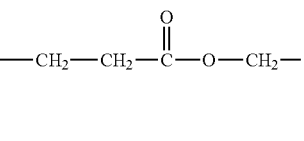 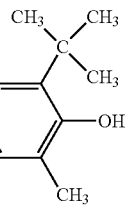

(Irganox® 245 from BASF SE)

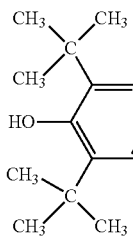 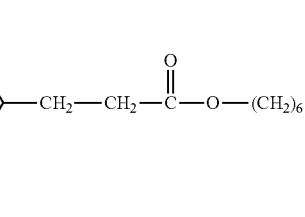 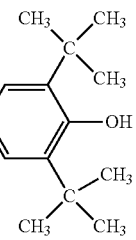

(Irganox® 259 from BASF SE)

Mention may be made overall, as examples of sterically hindered phenols, of the following:
2,2'-methylenebis(4-methyl-6-tert-butylphenol), 1,6-hexanediol bis[3-(3,5-di-tert-butyl-4-hydroxyphenyl)propionate], pentaerythritol tetrakis[3-(3,5-di-tert-butyl-4-hydroxyphenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-ditertbutyl-4-hydroxybenzyl)benzene, 4,4'-methylenebis(2,6-di-tert-butylphenol), 3,5-di-tert-butyl-4-hydroxybenzyldimethylamine.

Having proven particularly effective, and consequently used with preference, are 2,2'-methylenebis(4-methyl-6-tert-butylphenol), 1,6-hexanediol bis[3-(3,5-di-tert-butyl-4-hydroxyphenol)propionate] (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxyhydrocinnamide (Irganox® 1098) and the above-described Irganox® 245 from BASF SE.

In certain cases, sterically hindered phenols having not more than one sterically hindered groups in ortho-position to the phenolic hydroxyl group has proven particularly advantageous, particularly when assessing the color stability on storage in diffuse light over prolonged periods.

Another group of preferred antioxidants are the so-called copper stabilizers, in amounts of 0.02 to 1 wt. %, preferably 0.05 to 0.5 wt. %.

These copper stabilizers consist in general of two components, these being a mixture of copper compounds and specific halogen salts. The customary copper compounds are the copper(I) halides and also copper salts, such as copper acetate, copper sulfate, or copper stearate, and the copper complexes, as for example copper acetylacetonate. For these compounds to be effective as antioxidants, halogen compounds in large excess must be added. Use is made here more particularly of potassium iodide, but also potassium bromide. The amount used is customarily selected such that the molar copper:halogen ratio is 1:5-15. The recommended amount for addition is generally 30 to 200 ppm of copper. Preference, moreover, is given to copper complexes with the complex ligands triphenylphosphines, mercaptobenzimidazoles, acetylacetonates, and glycine. Especially preferred are triphenylphosphines and mercaptobenzimidazoles.

Preferred copper complexes used are formed customarily by reaction of copper(I) ions with the phosphine compounds or mercaptobenzimidazole compounds. These complexes may be obtained, for example, by reaction of triphenylphosphine with a chloroform suspension of copper(I) halide (G. Kosta, E. Reisenhofer, and L. Stafani, J. Inorg. Nucl. Chem. 27 (1965) 2581). It is also possible, though, to subject copper(II) compounds to reductive reaction with triphenylphosphine in order thus to obtain the copper(I) addition compounds (F. U. Jardine, L. Rule, A. G. Vohrei, J. Chem. Soc. (A) 238-241 (1970)).

Examples of suitable complexes may be represented by the following formulae:

[Cu(PPh$_3$)$_3$X], [Cu$_2$X$_2$(PPh$_3$)$_3$], [Cu(PPh$_3$)X]$_4$, and [Cu(PPh$_3$)$_2$)X], where X is selected from Cl, Br, I, CN, SCN, or 2-MBI.

Examples of antioxidants and heat stabilizers are sterically hindered phenols and/or phosphites and amines (e.g., TAD), hydroquinones, aromatic secondary amines such as diphenylamines, various substituted representatives of these groups, and mixtures thereof, in concentrations of up to 1 wt. %, based on the weight of the thermoplastic molding compounds.

As UV stabilizers, used generally in amounts of up to 2 wt. %, based on the molding compound, mention may be made of various substituted resorcinols, salicylates, benzotriazoles, and benzophenones.

Inorganic pigments, such as titanium dioxide, ultramarine blue, iron oxide, and carbon black, and also organic pigments, such as phthalocyanines, quinacridones, and perylenes, and also dyes, such as anthraquinones, may be added as colorants.

Nucleators contemplated include sodium phenylphosphinate, aluminum oxide, silicon dioxide, or talc.

Relative to known polyamide particles, the thermoplastic polyamide particles of the invention containing particulate inorganic fillers exhibit improved removal characteristics after the end of cycle in the washing operation. Moreover, they are not abrasive, since they have no sharp edges, and they exhibit advantageous laundering characteristics.

The thermoplastic polyamide particles comprise at least one polymeric ionic compound comprising imidazolium groups (imidazolium compound).

The polymeric imidazolium compound preferably contains at least 8 imidazolium rings, more preferably at least 10 imidazolium rings on average (number-based average) per polymer chain.

The polymeric imidazolium compounds remain in the polyamide particles formed and do not migrate or leach out of the polyamide particles when in contact with water. On the other hand, even at low application levels of 1 wt. % or 3 wt. %, based on the thermoplastic polyamide particles, the polymeric imidazolium compounds show sufficient activity at the surface of the polyamide particles so that their antimicrobial activity is sufficient for a prolonged period of time.

Preferably, the polymeric ionic compound contains at least one end group capable of forming a covalent bond with the polyamide. The end group is preferably an amino group. From mixing and heating of polymeric imidazolium compound and polyamide, a covalent bond or linkage between polymeric imidazolium compound and polyamide main chain is formed which immobilizes the polymeric imidazolium compound and inhibits migration or leaching out of the polyamide particles when in contact with water. This effect is most pronounced when a covalent bond or linkage between polymeric imidazolium compound and thermoplastic polyamide is achieved. The covalent bond or linkage is typically formed upon heating to temperatures in the range of 240 to 350° C.

Thus, the thermoplastic polyamide particles according to the present invention can be stored under wet conditions without showing issues with biofilm formation and discoloration. Consequently, the thermoplastic polyamide particles according to the present invention can be used several hundred times in industrial or household laundry washing processes before they need to be exchanged. They thus can help to improve wash results by reduction of other washing parameters like chemistry, temperature and time in specific washing machines, e. g. according to the Xeros technology.

The polymeric imidazolium compounds are knows per se. All available polymeric imidazolium compounds can be employed according to the present invention. Suitable polymeric imidazolium compounds are for example disclosed in U.S. Pat. No. 6,416,770, EP-A-0 594 329 and especially WO 2012/127009 and WO 2010/072571 and the further references discussed in the introductory parts thereof.

The polymeric imidazolium compounds employed according to the present invention show a superior antimicrobial or biocidal activity and can thus be employed for a long-lasting antimicrobial or biocidal activity in the thermoplastic polyamide particles, especially thermoplastic polyamide particles containing at least one particulate inorganic filler having a density of at least 2.5 g/cm³.

Specifically imidazolium compounds according to WO 2010/072571 and WO 2012/127009 show a rapid effect in their broad range of applications against various microorganisms.

These polymeric imidazolium compounds are described in more detail below. For a definition of certain terms like alkyl, cycloalkyl, aryl, alkylene, reference can be made to WO 2012/127009, page 11, line 25, to page 17, line 15.

Suitable imidazolium compounds for the biocide compositions according to the invention and methods for their production are described in WO 2010/072571 which is incorporated herein by reference. Accordingly, the imidazolium compounds can be obtained by a polycondensation reaction of at least one α-dicarbonyl compound, at least one aldehyde, at least one amino compound having at least two primary amino groups and at least one protic acid as essential starting materials. In a polycondensation, polymerization occurs with elimination of a low molecular weight compound, such as water or alcohol. In the present case, water is eliminated. When the carbonyl groups of the α-dicarbonyl compound are present completely or partly as ketal and/or the aldehyde group of the aldehyde is present as acetal or hemiacetal, an alcohol is correspondingly eliminated instead of water.

Preferably, the polymeric ionic compound comprising imidazolium groups (imidazolium compound) is obtainable by reacting a) at least one α-dicarbonyl compound,
b) at least one aldehyde,
c) at least one amino compound having at least two primary amino groups,
d) optionally an amino compound having only one primary amino group and
e) at least one protic acid,
and optionally subjecting the reaction product to an anion exchange,
where in the components a) and b) the aldehyde carbonyl groups may also be present as hemiacetal or acetal and the ketone carbonyl groups may also be present as hemiketal or ketal;
where the main chain of the at least one compound comprising imidazolium groups preferably does not contain 1,4-bound phenylene rings;
where the amino compound having at least two primary amino groups is preferably not 1,3-diamino-2-hydroxy-propane or 1,3-diamino-2-hydroxy-2-methyl-propane; and
where the polymer preferably comprises at least 8 imidazolium rings or wherein the at least one polymeric ionic compound comprising imidazolium groups (imidazolium compound) consists essentially of at least 8 repeat units of the general formula (IV)

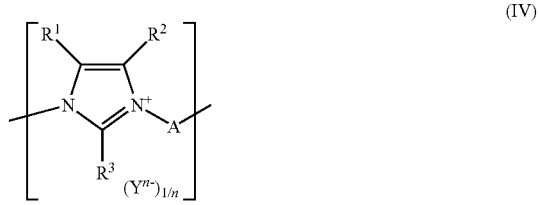

wherein
$R^1$ and $R^2$ are independently selected from hydrogen and in each case unsubstituted or substituted $C_1$-$C_{20}$-alkyl, $C_1$-$C_{20}$-alkoxy, $C_1$-$C_{20}$-alkylthio, $C_3$-$C_8$-cycloalkyl, $C_3$-$C_8$-cycloalkoxy, $C_3$-$C_8$-cycloalkylthio, aryl, aryloxy and arylthio and are preferably selected from hydrogen and in each case unsubstituted or substituted $C_1$-$C_{20}$-alkyl, $C_3$-$C_8$-cycloalkyl and aryl, R³ is selected from hydrogen, C₁-C₂₀-alkyl, C₃-C₈-cycloalkyl, optionally substituted aryl and a group —CH₂—[O—CH₂CH₂—]ₓ—ORᵃ, wherein x is 1, 2, 3, 4, 5 or 6 and Rᵃ is hydrogen or C₁-O₄-alkyl, and is preferably selected from hydrogen, C₁-C₂₀-alkyl and phenyl which may be substituted by 1, 2, 3, 4 or 5 radicals selected from C₁-C₂₀-alkyl, C₁-C₆-haloalkyl, C₁-C₂₀-alkoxy, C₁-C₆-haloalkoxy and NR'R", where R' and R'R" are, independently of each other, selected from hydrogen and C₁-C₆-alkyl, each A is independently a divalent aliphatic, alicyclic, aliphatic-alicyclic, aromatic or araliphatic radical, where the aliphatic moieties in the aforementioned aliphatic, aliphatic-alicyclic or araliphatic radicals may be interrupted by one or more nonadjacent groups which are selected from —O—, —S— and —N(Rᵇ)—, where Rᵇ is selected from hydrogen, C₁-C₂₀-alkyl and a group —[CH₂CH₂—O—]ᵧ—Rᶜ, wherein y is 1, 2, 3, 4, 5 or 6 and Rᶜ is hydrogen or C₁-C₄-alkyl; where alicyclic or aromatic moieties in the aforementioned alicyclic, aliphatic-alicyclic, aromatic or araliphatic radicals may be substituted by 1, 2, 3 or 4 radicals selected from C₁-C₂₀-alkyl, C₁-C₂₀-alkoxy, a radical of the formula —O—[CH₂CH₂O—]_z—Rᵈ, where Rᵈ is hydrogen or C₁-C₄-alkyl and z is 1, 2, 3, 4, 5 or 6; carboxyl and carboxylate, and where the aliphatic moieties in the aforementioned aliphatic, aliphatic-alicyclic or araliphatic radicals may be substituted by 1, 2, 3 or 4 radicals selected from C₁-C₂₀-alkoxy, a radical of the formula —O—[CH₂CH₂O—]_z—Rᵈ, where Rᵈ is hydrogen or C₁-C₄-alkyl and z is 1, 2, 3, 4, 5 or 6, carboxyl and carboxylate; and preferably does not contain 1,4-bound phenylene units and preferably is not 2-hydroxy-propane-1,3-diyl or 2-hydroxy-2-methyl-propane-1,3-diyl;

and A is preferably selected from a C₁-C₃₀-alkylene group which may be interrupted by one or more nonadjacent groups which are selected from —O—, —S— and —N(Rᵇ)—, where Rᵇ is selected from hydrogen, C₁-C₂₀-alkyl and a group —[CH₂CH₂—O—]ᵧ—Rᶜ, wherein y is 1, 2, 3, 4, 5 or 6 and Rᶜ is hydrogen or C₁-C₄-alkyl; more preferably A is selected from a group —(CH₂)ₘ— wherein m is an integer of 3 to 20, preferably 4 to 20, more preferably 4 to 12, where one CH₂ group may be substituted by a carboxyl or carboxylate group; a group —[B—X—]_k—B— in which each X independently is O or S, each B independently is C₂-C₆-alkylene, preferably C₂-C₃-alkylene; and k is an integer from 1 to 100, preferably 1 to 10 and more preferably 2 to 4; and a group of one of the following formulae

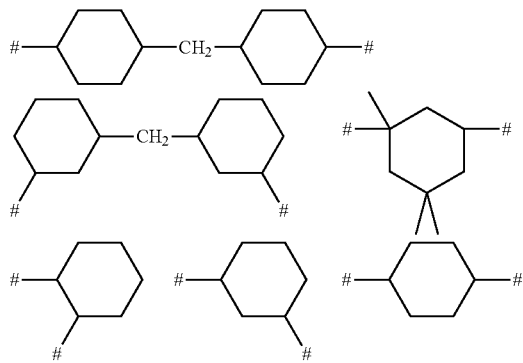

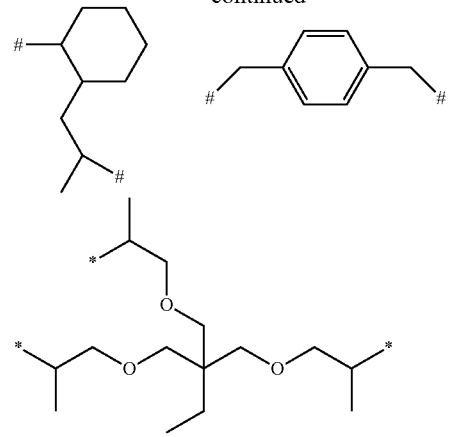

where # is the attachment point to the imidazolium ring; and $Y^{n-}$ an n-valent anion.

Compounds a) to e) are discussed below.

a) α-Dicarbonyl Compound

The α-dicarbonyl compound is preferably selected from compounds of the formula (I)

$$R^1—CO—CO—R^2 \qquad (I)$$

wherein

R¹ and R² are independently selected from hydrogen and in each case unsubstituted or substituted alkyl, alkoxy, alkylthio, cycloalkyl, cycloalkoxy, cycloalkylthio, aryl, aryloxy, arylthio. Preferably, R¹ and R² are independently selected from hydrogen and in each case unsubstituted or substituted alkyl, cycloalkyl and aryl and more preferably from hydrogen and in each case unsubstituted or substituted C₁-C₂₀-alkyl, C₃-C₈-cycloalkyl and aryl.

The α-dicarbonyl compound a) preferably comprises or consists of glyoxal. Thus, in particular R¹ and R² are hydrogen.

The aldehyde or keto group of the compound a) can also be present as hemiacetal, acetal, hemiketal or ketal, preferably of a lower alcohol, in particular a C₁-C₁₀-alkanol. In this case, the alcohol is eliminated in the condensation reaction forming the imidazolium compound.

Preferably, the compound a) is not employed in form of a hemiacetal, acetal, hemiketal or ketal.

b) Aldehyde

The aldehyde b) is preferably selected from compounds of the formula (II)

$$R^3—CHO \qquad (II)$$

wherein

R³ is selected from hydrogen, alkyl, cycloalkyl and aryl.

Preferably, R³ is selected from hydrogen, C₁-C₂₀-alkyl, C₃-C₈-cycloalkyl, optionally substituted aryl and a radical of the formula —CH₂—[O—CH₂CH₂—]ₓ—ORᵃ, wherein x is 1, 2, 3, 4, 5 or 6 and Rᵃ is hydrogen or C₁-C₄-alkyl, and is more preferably selected from hydrogen, C₁-C₂₀-alkyl, a group —CH₂—[O—CH₂CH₂—]ₓ—ORᵃ, wherein x is 1, 2, 3, 4, 5 or 6 and Rᵃ is hydrogen or C₁-C₄-alkyl and phenyl which may be substituted by 1, 2, 3, 4 or 5 radicals selected from C₁-C₂₀-alkyl, C₁-C₆-haloalkyl, C₁-C₂₀-alkoxy, C₁-C₆-haloalkoxy and NR'R", where R' and R'R" are, independently of each other, selected from hydrogen and C₁-C₆-alkyl.

Suitable aldehydes are e.g. formaldehyde, acetaldehyde, propionaldehyde, butanal, pentanal, hexanal, heptanal, octanal, nonanal, decanal, undecanal, dodecanal, tridecanal, tetradecanal and the higher homologs with up to 20 carbon atoms, benzaldehyde, substituted benzaldehydes, such as 2-, 3- or 4-methylbenzaldehyde, 2-, 3- or 4-trifluoromethylbenzaldehyde or 2-, 3- or 4-methoxybenzaldehyde, and aldehydes of formula CH(=O)—CH$_2$—[O—CH$_2$CH$_2$—]$_x$—OR$^a$, wherein x is 1, 2, 3, 4, 5 or 6 and R$^a$ is hydrogen or C$_1$-C$_4$-alkyl, derived from a polyethylene glycol or polythyleneglycol monoether of formula HOCH$_2$CH$_2$—[O—CH$_2$CH$_2$—]$_x$—OR$^a$, wherein x is 1, 2, 3, 4, 5 or 6 and R$^a$ is hydrogen or C$_1$-C$_4$-alkyl, in which one CH$_2$OH group in oxidized to a CHO group.

The aldehyde group of the aldehyde b) can also be present as hemiacetal or acetal, preferably as hemiacetal or acetal of a lower alcohol, in particular a C$_1$-C$_{10}$-alkanol. In this case, the alcohol is eliminated in the condensation reaction forming the imidazolium compound.

The aldehyde group is preferably not present as hemiacetal or acetal.

Preferably, component b) comprises or consists of a formaldehyde source. Thus, in particular R$^3$ is hydrogen. Suitable formaldehyde sources are formaldehyde, formaldehyde oligomers (e.g. trioxane) and polymers of formaldehyde (e.g. paraformaldehyde). More preferably, component b) comprises or consists of formaldehyde. In a suitable embodiment, the formaldehyde is employed as an aqueous solution (formalin solution).

Alternatively, the aldehyde is preferably selected from benzaldehyde and an aldehyde of formula R$^3$—CHO, where R$^3$ is C$_1$-C$_{20}$-alkyl, more preferably from acetaldehyde, propionaldehyde, butanal, pentanal, hexanal, heptanal, octanal, nonanal, decanal, undecanal, dodecanal, tridecanal, tetradecanal and the higher homologs with up to 20 carbon atoms, and benzaldehyde.

Specifically, the aldehyde is selected from formaldehyde (or a formaldehyde source), dodecanal and benzaldehyde and is very specifically formaldehyde (or a formaldehyde source).

c) Amino Compound Having at Least Two Primary Amino Groups

The amino compound is preferably selected from compounds of the formula (III)

A(NH$_2$)$_m$ (III)

wherein
m is an integer greater than or equal to 2, and
A is an m-valent organic radical.

In the formula (III), m indicates the number of primary amino groups bound to the group A. m can assume very large values, e.g. m can be an integer from 2 to 10 000, in particular from 2 to 5000. Very high values of m are present, e.g. if the compound c) of the formula (III) comprises a nitrogen-comprising polymer.

If only amino compounds c) of the formula (III) are employed, wherein m is 2 (diamines), the obtained imidazolium compounds are linear.

If at least one amino compound c) of the formula (III) is employed, wherein m is greater than 2, the obtained imidazolium compounds are branched.

In a preferred embodiment, m is an integer from 2 to 6, in particular from 2 to 4. More preferably, m is 2 (diamine) or m is 3 (triamine). In particular, m is 2.

In alternative embodiment, component c) comprises at least one amino compound having two primary amino groups and at least one amino compound having three primary amino groups. In this embodiment, m is a real number in a range of greater than 2 and less than 3.

The group A can be, in particular, a hydrocarbon group, which can be substituted or interrupted by functional groups comprising heteroatoms.

In a preferred embodiment, component c) is selected from amines of the formula 1 H$_2$N-A-NH$_2$ (1)

wherein
A is a divalent aliphatic, alicyclic, aliphatic-alicyclic, aromatic or araliphatic radical, where the aliphatic moieties in the aforementioned aliphatic, aliphatic-alicyclic or araliphatic radicals may be interrupted by one or more nonadjacent groups which are selected from —O—, —S— and —N(R$^b$)—, where R$^b$ is selected from hydrogen, C$_1$-C$_{20}$-alkyl and a group —[CH$_2$CH$_2$—O—]$_y$—R$^c$, wherein y is 1, 2, 3, 4, 5 or 6 and R$^c$ is hydrogen or C$_1$-C$_4$-alkyl; where alicyclic or aromatic moieties in the aforementioned alicyclic, aliphatic-alicyclic, aromatic or araliphatic radicals may be substituted by 1, 2, 3 or 4 radicals selected from C$_1$-C$_{20}$-alkyl, C$_1$-C$_{20}$-alkoxy, a radical of the formula —O—[CH$_2$CH$_2$O—]$_z$—R$^d$, where R$^d$ is hydrogen or C$_1$-C$_4$-alkyl and z is 1, 2, 3, 4, 5 or 6; carboxyl and carboxylate, and where the aliphatic moieties in the aforementioned aliphatic, aliphatic-alicyclic or araliphatic radicals may be substituted by 1, 2, 3 or 4 radicals selected from C$_1$-C$_{20}$-alkoxy, a radical of the formula —O—[CH$_2$CH$_2$O—]$_z$—R$^d$, where R$^d$ is hydrogen or C$_1$-C$_4$-alkyl and z is 1, 2, 3, 4, 5 or 6, carboxyl and carboxylate; with the proviso that preferably the aromatic or araliphatic radicals do not contain 1,4-bound phenylene rings;

amines of the formula 2

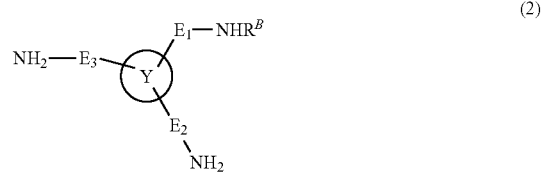

(2)

in which
Y is CR$^C$, N, C$_2$-C$_6$-alkyl or C$_3$-C$_6$-cycloalkyl;
E$_1$, E$_2$ and E$_3$, independently of each other, are a single bond, C$_1$-C$_{10}$-alkylene, —NR$^D$—C$_2$-C$_{10}$alkylene or —O—C$_1$-C$_{10}$-alkylene, with the proviso that E$_1$, E$_2$ and E$_3$ are not a single bond and are not —NR$^D$—C$_2$-C$_{10}$-alkylene when Y is N;
R$^C$ is H, C$_1$-C$_4$-alkyl, C$_2$-C$_4$-hydroxyalkyl or C$_1$-C$_4$-alkoxy and is preferably H, C$_1$-C$_4$-alkyl or C$_1$-C$_4$-alkoxy; and
R$^B$ and R$^D$, independently of each other, are H, C$_1$-C$_4$-alkyl, C$_2$-C$_4$-hydroxyalkyl or C$_1$-C$_4$-alkoxy and are preferably H, C$_1$-C$_4$-alkyl or C$_1$-C$_4$-alkoxy; and
mixtures thereof.

Divalent aliphatic radicals are those which comprise no cycloaliphatic, aromatic or heterocyclic constituents. Examples are alkylene, alkenylene and alkynylene radicals.

Divalent alicyclic radicals can comprise one or more, e.g. one or two, alicyclic radicals; however, they comprise no aromatic or heterocyclic constituents. The alicyclic radicals can be substituted by aliphatic radicals, but bonding sites for the NH$_2$ groups are located on the alicyclic radical.

Divalent aliphatic-alicyclic radicals comprise not only at least one divalent aliphatic radical but also at least one divalent alicyclic radical, it being possible for the two bonding sites for the NH$_2$ groups to both either be located on the alicyclic radical(s) or both on the aliphatic radical(s) or one on an aliphatic radical and the other on an alicyclic radical.

Divalent aromatic radicals can comprise one or more, e.g. one or two, aromatic radicals; however, they comprise no alicyclic or heterocyclic constituents. The aromatic radicals can be substituted by aliphatic radicals, but both bonding sites for the $NH_2$ groups are located on the aromatic radical(s).

Divalent araliphatic radicals comprise not only at least one divalent aliphatic radical but also at least one divalent aromatic radical, it being possible for the two bonding sites for the $NH_2$ groups to be located either both on the aromatic radical(s) or both on the aliphatic radical(s) or one on an aliphatic radical and the other on an aromatic radical.

Preferably, the divalent aliphatic radicals A are selected from linear and branched $C_1$-$C_{30}$-alkylene which may be interrupted by one or more nonadjacent groups which are selected from —O—, —S— and —N($R^b$)—, where $R^b$ is selected from hydrogen, $C_1$-$C_{20}$-alkyl and a group —O—[ $CH_2CH_2O$ ]$_y$—$R^c$, wherein y is 1, 2, 3, 4, 5 or 6 and $R^c$ is hydrogen or $C_1$-$C_4$-alkyl; and/or may be substituted by 1, 2, 3 or 4 radicals selected from $C_1$-$C_{20}$-alkoxy, a radical of the formula —O—[ $CH_2CH_2O$ ]$_z$—$R^d$, where $R^d$ is hydrogen or $C_1$-$C_4$-alkyl and z is 1, 2, 3, 4, 5 or 6, carboxyl and carboxylate.

More preferably, the divalent aliphatic radical A is linear or branched $C_2$-$C_{20}$-alkylene, even more preferably linear or branched $C_3$-$C_{20}$-alkylene, particularly preferably linear or branched $C_4$-$C_{20}$-alkylene and in particular linear or branched $C_4$-$C_{12}$-alkylene; specifically a linear $C_4$-$C_{12}$-alkylene. The alkylene chain may carry a carboxyl or carboxylate group. Preferably, the alkylene biradical is linear. Examples of suitable amines in which the radical A has this meaning ($C_2$-$C_{20}$-alkylene) are 2,2-dimethyl-1,3-propanediamine, 1,4-butylenediamine, 1,5-pentylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylenediamine, octadecamethylenediamine, nonadecamethylenediamine, eicosamethylenediamine, 2-butyl-2-ethyl-1,5-pentamethylenediamine, 2,2,4- or 2,4,4-trimethyl-1,6-hexamethylenediamine, 1,5-diamino-2-methylpentane, 1,4-diamino-4-methylpentane and the like. Among these, preference is given to 1,4-butylene diamine, 1,5-pentylene diamine, 1,6-hexylene diamine, 1,8-octylene diamine, 1,12-dodecylenediamine and mixtures thereof. Also preferred are the carboxyl- or carboxylate-substituted alkylene diamines of formulae $NH_2$—CH(COOH)$CH_2CH_2CH_2$—$NH_2$ and $NH_2$—CH(COO$^-$)$CH_2CH_2CH_2$—$NH_2$.

In an alternatively more preferred embodiment, the divalent aliphatic radical A is a group —[ B—X—]$_k$B— in which each X independently is —O—, —S— or —N($R^b$)—, where $R^b$ is selected from hydrogen, $C_1$-$C_{20}$-alkyl and a group —[ $CH_2CH_2$—O—]$_y$$R^c$, wherein y is 1, 2, 3, 4, 5 or 6 and $R^c$ is hydrogen or $C_1$-$C_4$-alkyl, preferably O, each B independently is $C_2$-$C_6$-alkylene, preferably $C_2$-$C_3$-alkylene; and k is an integer from 1 to 100, preferably 1 to 10 and more preferably 2 to 4. Examples of suitable amines in which the radical A has this meaning are amine-terminated polyoxyalkylene polyols, for example Jeff-Amines, such as 1,8-diamino-3,6-dioxaoctan, 1,13-diamino-4,7,10-trioxatridecan, 4,9-dioxadodecane-1,12-diamine and 4,7,10-trioxatridecane-1,13-diamine, or else more regular amine-terminated polyoxyalkylenediols (amine-terminated polyalkylene glycols; amine-terminated polyalkylene oxides), such as amine-terminated polyethylene glycols, amine-terminated polypropylene glycols or amine-terminated polybutylene glycols. The three last-mentioned amines (amine-terminated polyalkylene glycols) preferably have a molecular weight of from 100 to 3000 g/mol. Among these, preference is given to amines $NH_2$—[$CH_2CH_2O$]$_x$—$CH_2CH_2$—$NH_2$ with x being 2 or 3, preferably 2, and $NH_2$—$CH_2CH_2CH_2$—[$CH_2CH_2O$]$_x$—$CH_2CH_2CH_2$—$NH_2$ with x being 2 or 3, preferably 2.

Preferably, the divalent alicyclic radicals A are selected from $C_5$-$C_8$-cycloalkylene which may carry 1, 2, 3 or 4 $C_1$-$C_4$-alkyl radicals. Examples of suitable amines in which the radical A has this meaning are cyclopentylenediamine, such as 1,2-diaminocyclopentane or 1,3-diaminocyclopentane, cyclohexylenediamine, such as 1,2-diaminocyclohexane, 1,3-diaminocyclohexane or 1,4-diaminocyclohexane, 1-methyl-2,4-diaminocyclohexane, 1-methyl-2,6-diaminocyclohexane, cycloheptylenediamine, such as 1,2-diaminocycloheptane, 1,3-diaminocycloheptane or 1,4-diaminocycloheptane, and cyclooctylenediamine, such as 1,2-diaminocyclooctane, 1,3-diaminocyclooctane, 1,4-diaminocyclooctane or 1,5-diaminocyclooctane. The amino groups ($NH_2$ groups) may be in the cis or trans position relative to one another.

Preferably, the divalent aliphatic-alicyclic radicals A are selected from $C_1$-$C_4$-alkylene-$C_5$-$C_8$-cycloalkylene, $C_5$-$C_8$-cycloalkylene-$C_1$-$C_4$-alkylene-$C_5$-$C_8$-cycloalkylene and $C_1$-$C_4$-alkylene-$C_5$-$C_8$-cycloalkylene-$C_1$-$C_4$-alkylene, where the cycloalkylene radicals may carry 1, 2, 3 or 4 $C_1$-$C_4$-alkyl radicals. Examples of suitable amines in which the radical A has this meaning are diaminodicyclohexylmethane, such as bis(4-aminocyclohexyl)methane or bis(3-aminocyclohexyl)methane; isophoronediamine, bis(aminomethyl)cyclohexane, such as 1,1-bis(aminomethyl)cyclohexane, 1,2-bis(aminomethyl)cyclohexane, 1,3-bis(aminomethyl)cyclohexane or 1,4-bis(aminomethyl)cyclohexane, 2-aminopropylcyclohexylamine, 3(4)-aminomethyl-1-methylcyclohexylamine, 2-(2-aminopropyl)cyclohexylamine and the like. The groups bonded to the alicyclic radical can in each case assume any desired position (cis/trans) relative to one another.

Preferably, the divalent aromatic radicals A are selected from 1,2-phenylene, 1,3-phenylene, naphthylene and biphenylene, with the phenylene radicals possibly carrying 1, 2, 3 or 4 radicals selected from $C_1$-$C_{20}$-alkyl, $C_1$-$C_{20}$-alkoxy and a radical of the formula —O—[ $CH_2CH_2O$ ]$_z$—$R^d$, where $R^d$ is hydrogen or $C_1$-$C_4$-alkyl and z is 1, 2, 3, 4, 5 or 6. Examples of suitable amines in which the radical A has this meaning are o-phenylenediamine, m-phenylenediamine, tolylenediamine, such as o-, m- and p-tolylenediamine, xylylenediamine, and naphthylenediamine, such as 1,2-, 1,3-, 1,4-, 1,5-, 1,8-, 2,3-, 2,6- and 2,7-naphthylene.

Preferably, the divalent araliphatic radicals A are selected from phenylene-$C_1$-$C_4$-alkylene, phenylene-$C_1$-$C_4$-alkylene-phenylene and $C_1$-$C_4$-alkylene-phenylene-$C_1$-$C_4$-alkylene, with the phenylene radicals possibly carrying 1, 2, 3 or 4 radicals selected from $C_1$-$C_{20}$-alkyl, $C_1$-$C_{20}$-alkoxy and a radical of the formula —O—[ $CH_2CH_2O$ ]$_z$—$R^d$, where $R^d$ is hydrogen or $C_1$-$C_4$-alkyl and z is 1, 2, 3, 4, 5 or 6. Examples of suitable amines in which the radical A has this meaning are diaminodiphenylmethane, such as 2,2'-, 3,3'- and 4,4'-diaminodiphenylmethane, 3-aminomethyl-benzylamine and the like.

Examples for amines 2 are compounds of the formula (2.A)

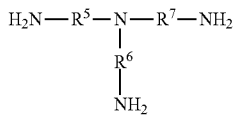
(2.A)

wherein $R^5$, $R^6$ and $R^7$ are each, independently of one another, a $C_1$-$C_{10}$ alkylene group, particularly preferably a $C_2$-$C_6$-alkylene group;
such as N,N-bis(3-aminopropyl)ethylenediamine, N,N-bis(3-aminopropyl)propane-1,3-diamine, N,N-bis(3-aminopropyl)butane-1,4-diamine, tris(2-aminoethyl)amine, tris(2-aminopropyl)amine, tris(3-aminopropyl)amine, tris(2-aminobutyl)amine, tris(3-aminobutyl)amine, tris(4-aminobutyl)amine, tris(5-aminopentyl)amine and tris(6-aminohexyl)amine. In a preferred embodiment, $R^5$, $R^6$ and $R^7$ have the same meaning. A preferred compound (2.A) is tris(2-aminoethyl)amine ($R^5=R^6=R^7$=ethylene).

Further examples of amines 2 are trisaminohexane, trisaminononane, 4-aminomethyl-1,8-octamethylenediamine and the like.

Further examples of amines 2 are the compounds of following structures (2.B) or (2.C):

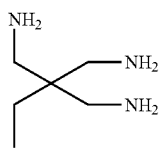
(2.B)

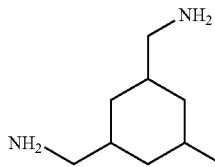
(2.C)

Further examples of amines 2 are amines of the formula 2, wherein Y is $CR^C$, where $R^C$ is H or $C_1$-$C_4$-alkyl, and $E_1$, $E_2$ and $E_3$, independently of each other, are —O—$C_1$-$C_6$-alkylene, preferably —O—$CH_2CH_2CH(CH_3)$—. Among these, preference is given to a compound wherein Y is $CR^C$, where $R^C$ is ethyl, and $E_1$, $E_2$ and $E_3$ are —O—$CH_2CH_2CH(CH_3)$—.

Among the above compounds 2, preference is given to the amine of the formula 2, wherein Y is $CR^C$, where $R^C$ is ethyl, and $E_1$, $E_2$ and $E_3$ are —O—$CH_2CH_2CH(CH_3)$—.

In particular, the amine c) is selected from:
compounds of the formula $H_2N$—$(CH_2)_m$—$NH_2$, wherein m is an integer of 3 to 20, preferably 4 to 20, more preferably 4 to 12, where a $CH_2$ group may be substituted by a carboxyl or carboxylate group, such as 1,3-propylenediamine, 1,4-butylenediamine, 1,5-pentylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylenediamine, octadecamethylenediamine, nonadecamethylenediamine, eicosamethylenediamine, the carboxyl- or carboxylate-substituted alkylene diamines of formulae $NH_2$—$CH(COOH)CH_2CH_2CH_2$—$NH_2$ or $NH_2$—$CH(COO^-)CH_2CH_2CH_2$—$NH_2$; especially 1,4-butylene diamine, 1,5-pentylene diamine, 1,6-hexylene diamine, 1,8-octylene diamine, 1,12-dodecylenediamine and the carboxyl- or carboxylate-substituted alkylene diamines of formulae $NH_2$—$CH(COOH)CH_2CH_2CH_2$—$NH_2$ or $NH_2$—$CH(COO^-)CH_2CH_2CH_2$—$NH_2$;

compounds of the formula $NH_2$—$[B$—$X]_k$—$B$—$NH_2$; in which each X independently is —O—, —S— or —N($R^b$)—, where $R^b$ is selected from hydrogen, $C_1$—$O_{20}$-alkyl and a group —$[CH_2CH_2$—$O]_y$—$R^c$, wherein y is 1, 2, 3, 4, 5 or 6 and $R^c$ is hydrogen or $C_1$-$C_4$-alkyl, preferably 0; each B independently is $C_2$-$C_6$-alkylene, preferably $C_2$-$C_3$-alkylene; and k is an integer from 1 to 100, preferably 1 to 10, more preferably 2 to 4, such as 1,8-diamino-3,6-dioxaoctan, 1,13-diamino-4,7,10-trioxatridecan, 4,9-dioxadodecane-1,12-diamine and 4,7,10-trioxatridecane-1,13-diamine, or else more regular amine-terminated polyoxyalkylenediols (amine-terminated polyalkylene glycols; amine-terminated polyalkylene oxides), such as amine-terminated polyethylene glycols, amine-terminated polypropylene glycols or amine-terminated polybutylene glycols; especially $NH_2$—$[CH_2CH_2O]_x$—$CH_2CH_2$—$NH_2$ with x being 2 or 3, preferably 2, and $NH_2$—$CH_2CH_2CH_2[CH_2CH_2O]_x$—$CH_2CH_2CH_2$—$NH_2$ with x being 2 or 3, preferably 2;

bis(4-aminocyclohexyl)methane, bis(3-aminocyclohexyl)methane, isophoronediamine, 1,1-bis(aminomethyl)cyclohexane, 1,2-bis(aminomethyl)cyclohexane, 1,3-bis(aminomethyl)cyclohexane, 1,4-bis(aminomethyl)cyclohexane, 2-aminopropylcyclohexylamine, 3(4)-aminomethyl-1-methylcyclohexylamine, 2-(2-aminopropyl)-cyclohexylamine; especially bis(4-aminocyclohexyl)methane, bis(3-aminocyclohexyl)methane, isophoronediamine;

3-aminomethyl-benzylamine;

amines of the formula 2, wherein Y is $CR^C$, where $R^C$ is H or $C_1$-$C_4$-alkyl, and $E_1$, $E_2$ and $E_3$, independently of each other, are —O—$C_1$-$C_6$-alkylene, preferably —O—$CH_2CH_2CH(CH_3)$—; especially the amine of the formula 2, wherein Y is $CR^C$, where $R_C$ is ethyl, and $E_1$, $E_2$ and $E_3$ are —O—$CH_2CH_2CH(CH_3)$—; and mixtures thereof.

It is of course also possible to use in the thermoplastic polyamide particles of the invention imidazolium compounds that are obtained from a mixture of two or more than two different amino compounds c). If an amine of formula 2 is used, it is even preferred to use it in combination with a diamine $A(NH_2)_m$ with m being 2. In a preferred embodiment, the mixture of amino compounds c) comprises at least two amino compounds having different numbers of primary amino groups. The use of diamines (m=2) in admixture with amino compounds having more than two primary amino groups (m>2), e.g. triamines, enables the desired degree of crosslinking or degree of branching to be set via the proportion of amines with m=2 to amines m>2.

Preferred mixtures of amino compounds c) are the following:
tris(2-aminoethyl)amine
tris(2-aminoethyl)amine and 1,4-butylenediamine
tris(2-aminoethyl)amine and 1,5-pentylene diamine
tris(2-aminoethyl)amine and 1,6-hexylene diamine the amine of the formula 2, wherein Y is CR$^C$, where R$^C$ is ethyl, and E$_1$, E$_2$ and E$_3$ are —O—CH$_2$CH$_2$CH(CH$_3$)— and 1,4-butylenediamine.

In a preferred embodiment, the amino compound c) has a molecular weight of less than 10 000 g/mol, particularly preferably less than 5000 g/mol, very particularly preferably less than 1000 g/mol, in particular less than 500 g/mol.

Possible diamines and triamines are, in particular, compounds having a molecular weight of from 60 to 500 g/mol or from 60 to 250 g/mol.

In a further preferred embodiment, component c) is selected from nitrogen-comprising polymers. Preferably, component c) is selected from polyvinylamine polymers.

Suitable poly(amidoamines) c) preferably have a number average molecular weight in the range of from 150 to 1 000 000, more preferably 250 to 10 000.

Most preferred starting materials are C$_4$-C$_{16}$-alkylene diamines, more preferably C$_4$-C$_{12}$-alkylene diamines, or xylylenediamine. Specifically, butylene diamine, dodecylene diamine or xylylene diamine are employed.

d) Other Starting Materials

In the process of the invention, it is possible to use further compounds, e.g. in order to introduce specific end groups into the polymer or bring about additional crosslinking by means of further functional groups, to set defined properties or to make further reactions on the resulting polymer (polymer-analogous reactions) at a later point in time possible.

Thus, if desired, it is possible to make concomitant use of, for example, compounds having only one primary amino group (=component d)) in order to influence the molecular weight of the polymeric imidazolium compounds. The compound having only one primary amino group leads to chain termination and then forms the end group of the polymer chain concerned. The higher the proportion of compounds having only one primary amino group, the lower the molecular weight. Based on 100 mol of amino compounds having at least two primary amino groups, it is possible, in a preferred embodiment, to use, for example, from 0 to 10 mol of compounds having only one primary group.

e) Protic Acid

The anions of the imidazolium compound are derived from the anions of the protic acid(s) employed as component e). It is also possible to subject the imidazolium compound to an anion exchange. This allows the preparation of imidazolium compounds with anions for which no corresponding stable protic acid exists. The anion exchange can be effected by known methods, e.g. transprotonation, reaction with a metal salt, ion exchange chromatography, electrolytically or by means of a combination of these measures.

The imidazolium compound employed according to the invention comprises anions that act as counterions to the imidazolium cations. The anions are selected from anions of the formula Y$^{n-}$, wherein n is the valency of the anion. The corresponding protic acid can be represented by the formula Y$^{n-}$ (H$^+$)$_n$.

In a first embodiment, the anions of the formula Y$^{n-}$ are selected from anions of inorganic acids and low molecular weight organic acid. In this embodiment, m is preferably an integer from 1 to 6, more preferably an integer from 1 to 4, in particularly 1 or 2. In a special embodiment, n is 1.

In a second embodiment, the anions of the formula Y$^{n-}$ are selected from anions of polymeric protic acids, e.g. polyacrylic acid. In this embodiment, n can assume very high values. Suitable polymeric protic acids comprise at least one ethylenically unsaturated organic acid in polymerized form. Preferred ethylenically unsaturated organic acid are selected from acrylic acid, methacrylic acid, maleic acid, fumaric acid, itaconic acid, etc. and mixtures thereof. Especially preferred are the homo- and copolymers of acrylic acid and/or methacrylic acid. Suitable polymeric protic acids are also the copolymers of at least one ethylenically unsaturated organic acid, preferably selected from acrylic acid methacrylic acid, maleic acid, fumaric acid, itaconic acid with at least one copolymerizable comonomer, e.g. selected from (meth)acrylates, vinyl esters or aromatic monomers such as styrene and mixtures thereof.

The anions of the imidazolium compound (=anions of the formula Y$^{n-}$) and the anions of the corresponding protic acid (=Y$^{n-}$ (H$^+$)$_n$) are preferably selected from:

the group of halides and halogen-comprising anions of the general formulae:
F$^-$, Cl$^-$, Br$^-$, I$^-$, BF$_4^-$, PF$_6^-$, AlCl$_4^-$, Al$_2$Cl$_7^-$, Al$_3$Cl$_{10}^-$, AlBr$_4^-$, FeCl$_4^-$, BCl$_4^-$, SbF$_6^-$, AsF$_6^-$, —ZnCl$_3^-$, SnCl$_3^-$, CuCl$_2^-$;

the group of pseudohalides and other nitrogen-containing anions of the formulae:
CN$^-$, SCN$^-$, OCN$^-$, NO$_2^-$, NO$_3^-$, N(CN)$^-$;

the group of sulfates, sulfites and sulfonates of the general formulae:
SO$_4^{2-}$, HSO$_4^-$, SO$_3^{2-}$, HSO$_3^-$, R$^a$OSO$_3^-$, R$^a$SO$_3^-$;

the group of phosphates of the general formulae:
PO$_4^{3-}$, HPO$_4^{2-}$, H$_2$PO$_4^-$, R$^a$PO$_4^{2-}$, HR$^a$PO$_4^-$, R$^a$R$^b$PO$_4^-$;

the group of phosphonates and phosphinates of the general formulae:
R$^a$HPO$_3^-$, R$^a$R$^b$PO$_2^-$, R$^a$R$^b$PO$_3^-$;

the group of phosphites of the general formulae:
PO$_3^{3-}$, HPO$_3^{2-}$, H$_2$PO$_3^-$, R$^a$PO$_3^{2-}$, R$^a$HPO$_3^-$, R$^a$R$^b$PO$_3^-$;

the group of phosphonites and phosphinites of the general formulae:
R$^a$R$^b$PO$_2^-$, R$^a$HPO$_2^-$, R$^a$R$^b$PO$^-$, R$^a$HPO$^-$;

the group of carboxylates and polybasic carboxylic acids of the formulae:
R$^a$COO$^-$; R$^e$(COO$^-$)$_f$;

the group of borates of the general formulae:
BO$_3^{3-}$, HBO$_3^{2-}$, H$_2$BO$_3^-$, R$^a$R$^b$BO$_3^-$, R$^a$HBO$_3^-$, R$^a$BO$_3^{2-}$, B(OR$^a$)(OR$^b$)(OR$^c$)(OR$^d$)$^-$, B(HSO$_4$)$^-$, B(RaSO$_4$)$^-$;

the group of boronates of the general formulae:
R$^a$BO$_2^{2-}$, R$^a$R$^b$BO$^-$;

the group of halogenated hydrocarbons of the general formulae:
CF$_3$SO$_3^-$, (CF$_3$SO$_3$)$_2$N$^-$, CF$_3$CO$_2^-$, CCl$_3$CO$_2^-$;

the group of carbonates and carbonic esters of the general formulae:
HCO$_3^-$, CO$_3^{2-}$, R$_a$CO$_3^-$;

the group of silicates and silicic esters of the general formulae:
SiO$_4^{4-}$, HSiO$_4^{3-}$, H$_2$SiO$_4^{2-}$, H$_3$SiO$_4^-$, R$^a$R$^b$SiO$_4^{2-}$, R$^a$R$^b$R$^c$SiO$_4^-$, HR$^a$SiO$_4^{2-}$, H$_2$R$^a$SiO$_4^-$, HR$^a$R$^b$SiO$_4^-$;

the group of alkylsilane and arylsilane salts of the general formulae:
R$^a$SiO$_3^{3-}$, R$^a$R$^b$SiO$_2^{2-}$, R$^a$R$^b$R$^c$SiO$^-$, R$^a$R$^b$R$^c$SiO$_3^-$, R$^a$R$^b$R$^c$SiO$_2^-$, R$^a$R$^b$SiO$_3^{2-}$;

the group of carboximides, bis(sulfonyl)imides like TFSI and sulfonylimides of the general formulae:

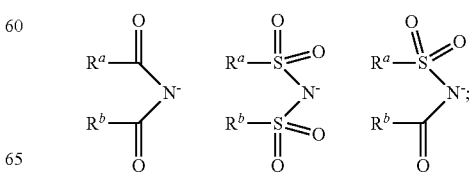

the group of methides of the general formula:

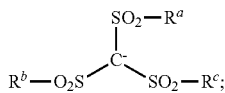

the group of alkoxides and aryloxides of the general formula:
$R^aO^-$;
the group of halometalates of the general formula:
$[M_rHal_t]^{s-}$,
where M is a metal and Hal is fluorine, chlorine, bromine or iodine, r and t are positive integers and indicate the stoichiometry of the complex and s is a positive integer and indicates the charge on the complex;
the group of sulfides, hydrogensulfides, polysulfides, hydrogenpolysulfides and thiolates of the general formulae:
$S^{2-}$, $HS^-$, $[S_v]^{2-}$, $[HS_v]^-$, $[R^aS]^-$,
where v is a positive integer from 2 to 10;
the group of complex metal ions such as $Fe(CN)_6^{3-}$, $Fe(CN)_6^{4-}$, $MnO_4^-$, $Fe(CO)_4$.

In the above formulae, $R^a$, $R^b$, $R^c$ and $R^d$ are each, independently of one another, nonacidic hydrogen, $C_1$-$C_{30}$-alkyl and aryl-, heteroaryl-, cycloalkyl-, halogen-, hydroxy-, amino-, carboxy-, formyl-, —O—, —CO—, —CO—O— or —CO—N<substituted derivatives thereof, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_qF_{2(q-a)+(1-b)}H_{2a+b}$ where q≤30, 0≤a≤q and b=0 or 1 (for example $CF_3$, $C_2F_5$, $CH_2CH_2$—$C_{(q-2)}F_{2(q-2)+1}$, $C_6H_{13}$, $C_8F_{17}$, $C_{10}F_{21}$, $C_{12}F_{25}$); $C_3$-$C_{12}$-cycloalkyl and aryl-, heteroaryl-, cycloalkyl-, halogen-, hydroxy-, amino-, carboxy-, formyl-, —O—, —CO— or —CO—O-substituted derivatives thereof, for example cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_qF_{2(q-a)-(1-b)}H_{2a-b}$, where q≤30, 0≤a≤q and b=0 or 1; $C_2$-$C_{30}$-alkenyl and aryl-, heteroaryl-, cycloalkyl-, halogen-, hydroxy-, amino-, carboxy-, formyl-, —O—, —CO— or —CO—O-substituted derivatives thereof, for example 2-propenyl, 3-butenyl, cis-2-butenyl, trans-2-butenyl or $C_qF_{2(q-a)-(1-b)}H_{2a-b}$ where q≤30, 0≤a≤q and b=0 or 1; $C_3$-$C_{12}$-cycloalkenyl and aryl-, heteroaryl-, cycloalkyl-, halogen-, hydroxy-, amino-, carboxy-, formyl-, —O—, —CO— or —CO—O-substituted derivatives thereof, for example 3-cyclopentenyl, 2-cyclohexenyl, 3-cyclohexenyl, 2,5-cyclohexadienyl or $C_qF_{2(q-a)-3(1-b)}H_{2a-3b}$ where q≤30, 0≤a≤q and b=0 or 1;
aryl or heteroaryl having from 2 to 30 carbon atoms and alkyl-, aryl-, heteroaryl-, cycloalkyl-, halogen-, hydroxy-, amino-, carboxy-, formyl-, —O—, —CO— or —CO—O-substituted derivatives thereof, for example phenyl, 2-methylphenyl (2-tolyl), 3-methylhenyl (3-tolyl), 4-methylphenyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, 4-pyridinyl or $C_6F_{(5-a)}H_a$, where 0≤a≤5; or
two radicals form an unsaturated, saturated or aromatic ring which may optionally be substituted by functional groups, aryl, alkyl, aryloxy, alkyloxy, halogen, heteroatoms and/or heterocycles and may optionally be interrupted by one or more oxygen and/or sulfur atoms and/or one or more substituted or unsubstituted imino groups.

Particular preference is given to $R^a$, $R^b$, $R^c$ and $R^d$ each being, independently of one another, hydrogen and particularly preferably a $C_1$-$C_{10}$-alkyl group, preferably a $C_1$-$C_4$-alkyl group. $R^e$ (see above formula for the polybasic carboxylic acid) is an organic radical to which a plurality of carboxylic acid groups are bound. Correspondingly, f is an integer of at least 2. Preferably, f is an integer of 2 to 100 000, more preferably, 2 to 10 000. Such polybasic carboxylic acids can be, for example, maleic acid or itaconic acid, phthalic acid, isophthalic acid or terephthalic acid; other possibilities are polymeric compounds which can be obtained, for example, by free-radical polymerization of ethylenically unsaturated compounds using, possibly among others, monomers having one or two carboxylic acid groups, e.g. (meth)acrylic acid.

Particular preference is given to carboxylic acids, i.e. protic acids of the above carboxylates of the general formulae:

$R^aCOO^-$ and $R^e(—COO^-)_f$

As such carboxylic acids or carboxylates, particular mention may be made of organic compounds which have from 1 to 20 carbon atoms and comprise one or two carboxylate groups, preferably one carboxylate group.

The carboxylic acids or carboxylates can be aliphatic or aromatic compounds. Here, aromatic compounds are compounds comprising aromatic groups. Particular preference is given to aliphatic or aromatic compounds which, apart from the oxygen atoms of the carboxylate group, comprise no further heteroatoms or at most comprise one or two hydroxyl groups, carbonyl groups or ether groups. Very particular preference is given to aliphatic or aromatic compounds which comprise no further heteroatoms in addition to the oxygen atoms of the carboxylate group.

As compounds having two carboxylate groups, mention may be made of, for example, the anions of phthalic acid, of isophthalic acid, of $C_2$-$C_6$-dicarboxylic acids, e.g. oxalic acid, malonic acid, succinic acid, glutaric acid, adipic acid.

As compounds having one carboxylate group, mention may be made of the anions of aliphatic, aromatic, saturated or unsaturated $C_1$-$C_{20}$-carboxylic acids, in particular alkanecarboxylic acids, alkenecarboxylic acids, alkynecarboxylic acids, alkadienecarboxylic acids, alkatrienecarboxylic acids, hydroxycarboxylic acids or ketonecarboxylic acids or aromatic carboxylic acids such as benzoic acid or phenylacetic acid. Suitable alkanecarboxylic acids, alkenecarboxylic acids and alkadienecarboxylic acids are also known as fatty acids.

As anions $Y^-$, mention may be made of, in particular, the anions of $C_1$-$C_{20}$-alkanecarboxylic acids, which may optionally be substituted by one or two hydroxy groups, preferably one hydroxy group.

Further preferred protic acids or preferred anions of protic acids are, apart from carboxylic acids (carboxylates), also sulfonic acid, phosphoric acid or phosphonic acid, with the acid groups of the sulfonic acid, phosphoric acid or phosphonic acid being able to be partially esterified.

As phosphoric acid and esters thereof, mention may be made of, in particular, compounds of the formula VII

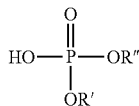

where R' and R" are each, independently of one another, hydrogen or a $C_1$-$C_{10}$—, preferably $C_1$-$C_4$-alkyl group.

As phosphonic acid and esters thereof, mention may be made of, in particular, compounds of the formula VIII

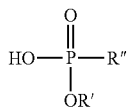

where R' and R" are each, independently of one another, hydrogen or a $C_1$-$C_{10}$—, preferably $C_1$-$C_4$-alkyl group.

Preferably, the at least one protic acid e) is not a hydrohalic acid, especially if the composition is a cosmetic or a personal care composition. Accordingly, the imidazolium compound employed in the biocide composition according to the invention does essentially not comprise anions of a hydrohalic acid ($F^-$, $Cl^-$, $Br^-$ and $I^-$). In the context of the invention, an imidazolium compound which does essentially not comprise anions of a hydrohalic acid denotes an imidazolium compound that comprises at the most 1 mole %, preferably at the most 0.1 mole %, more preferably at the most 0.01 mole, in particular at the most 0.001 mole %, based on the total anion content anions of a hydrohalic acid.

Preferably, the anions are selected from:
the group of carboxylates and polybasic carboxylic acids
the group of sulfates, sulfites and sulfonates,
the group of phosphates, and
the group of halogenated hydrocarbons.

In particular, the anions are selected from formate, acetate, propionate, butyrate, pentanoate, hexanoate, heptanoate, octanoate, glycolate (hydroxyacetate), adipate, succinate, phthalate, terephthalate, methoxyacetate, ($C_1$-$C_4$-alkoxy)$(CH_2CH_2O)_x CH_2COO^-$ with x being 1-4, benzoate, hydrogenphosphate, sulfate, hydrogensulfate and methanesulfonate.

Most preferred are bis(sulfonyl)imides like bis(trifluormethanesulfonyl)imide, (hydrogen)sulfate and tosylate.

In a preferred embodiment, the imidazolium compound consists essentially of repeat units of the general formula (IV), as defined in the following. Irrespective of the method of their preparation, imidazolium compound which consists essentially of repeat units of the general formula (IV), are particularly advantageous as biocides. Therefore, in a further aspect of the invention the at least one polymeric, ionic compound comprising imidazolium groups (imidazolium compound), consists essentially of repeat units of the general formula (IV)

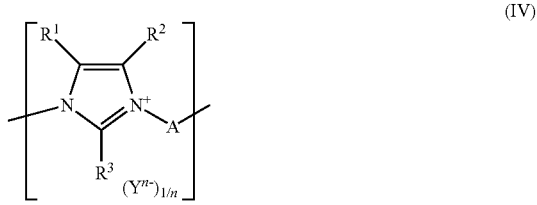

wherein
$R^1$ and $R^2$ are independently selected from hydrogen and in each case unsubstituted or substituted alkyl (preferably $C_1$-$C_{20}$-alkyl), alkoxy (preferably $C_1$-$C_{20}$-alkoxy), alkylthio (preferably $C_1$-$C_{20}$-alkylthio), cycloalkyl (preferably $C_3$-$C_8$-cycloalkyl), cycloalkoxy (preferably $C_3$-$C_8$-cycloalkoxy), cycloalkylthio (preferably $C_3$-$C_8$-cycloalkylthio), aryl, aryloxy, arylthio,
$R^3$ is selected from hydrogen, alkyl (preferably $C_1$-$C_{20}$-alkyl), cycloalkyl (preferably $C_3$-$C_8$-cycloalkyl), optionally substituted aryl and a group —$CH_2$—$[O$—$CH_2CH_2]_x$—$OR^a$, wherein x is 1, 2, 3, 4, 5 or 6 and $R^a$ is hydrogen or $C_1$-$C_a$-alkyl,
each A independently has one of the general or preferred meanings given above and does preferably not contain 1,4-bound phenylene units and is preferably not 2-hydroxypropane-1,3-diyl or 2-hydroxy-2-methyl-propane-1,3-diyl; and A is preferably selected from a $C_1$-$C_{30}$-alkylene group which may be interrupted by one or more nonadjacent groups which are selected from —O—, —S— and —$N(R^b)$—, where $R^b$ is selected from hydrogen, $C_1$-$C_{20}$-alkyl and a group $[CH_2CH_2$—$O]_y$—$R^c$, wherein y is 1, 2, 3, 4, 5 or 6 and $R^c$ is hydrogen or $C_1$-$C_4$-alkyl, preferably 0; and A is more preferably selected from a group —$(CH_2)_m$— wherein m is an integer of 3 to 20, preferably 4 to 20, more preferably 4 to 12, where one $CH_2$ group may be substituted by a carboxyl or carboxylate group, especially 1,4-butylene, 1,5-pentylene, 1,6-hexylene, 1,8-octylene and 1,12-dodecylene; a group $[B$—$X]_k$—$B$— in which each X independently is —O—, —S— or —$N(R^b)$—, where $R^b$ is selected from hydrogen, $C_1$-$C_{20}$-alkyl and a group $[CH_2CH_2$—$O]_y$—$R^c$, wherein y is 1, 2, 3, 4, 5 or 6 and $R^c$ is hydrogen or $C_1$-$C_4$-alkyl, preferably 0, each B independently is $C_2$-$C_6$-alkylene, preferably $C_2$-$C_3$-alkylene; and k is an integer from 1 to 100, preferably 1 to 10 and more preferably 2 to 4, especially —$[CH_2CH_2O]_x$—$CH_2CH_2$— with x being 2 or 3, preferably 2, and —$CH_2CH_2CH_2$—$[CH_2CH_2O]_x$—$CH_2CH_2CH_2$— with x being 2 or 3, preferably 2; and a group of one of the following formulae

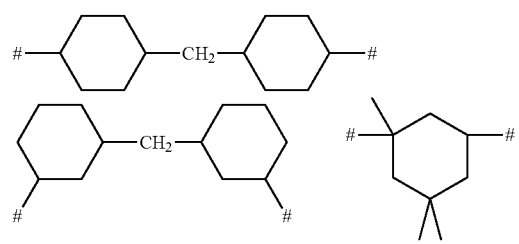

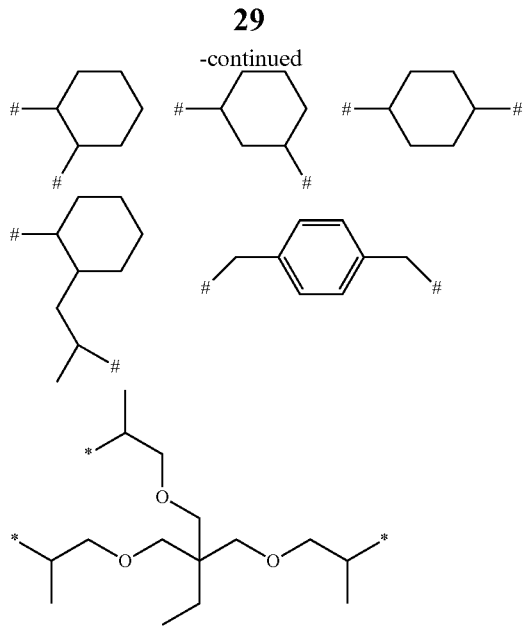

where # is the attachment point to the imidazolium ring; and

Y$^{n-}$ an n-valent anion.

The polymeric, ionic compound preferably contains at least 8 repeating units IV, e.g. 8 to 500, preferably 8 to 300, more preferably 8 to 200, even more preferably 8 to 150 and in particular 10 to 150 repeating units IV.

In the imidazolium compounds the repeat units of the formula (IV) may have the same or different meanings. Thus, it is e.g. possible to employ a mixture of different amino compounds c) for the preparation of imidazolium compounds to obtain repeat units with different groups A. It is also possible that the imidazolium compounds comprise different anions Y$^{n-}$.

In the context of the invention, an imidazolium compound which consists essentially of repeat units of the general formula (IV) denotes an imidazolium compound that comprises least 60% by weight, preferably at least 70% by weight, more preferably at least 80% by weight, in particularly at least 90% by weight, especially at least 95% by weight, of structural units of the formula IV.

With regard to suitable and preferred meanings of R$^1$, R$^2$, R$^3$, A and Y$^{n-}$ reference is made to the afore-mentioned definitions of those groups.

In the structural units of the formula IV preferably R$^1$ and R$^2$ are hydrogen.

In the structural units of the formula IV specifically R$^3$ is hydrogen, C$_1$-C$_{20}$-alkyl or phenyl and more specifically hydrogen.

In a specific embodiment, in the structural units of the formula IV preferably A is selected from 1,4-butylene, 1,5-pentylene, 1,6-hexylene, 1,8-octylene, 1,12-dodecylene, 3,6-dioxa-1,8-octylene, 4,7,10-trioxa-1,13-tridecylene, a group —[ B—X—]$_k$—B— in which each X independently is —O—, —S— or —N(R$^b$)—, where R$^b$ is selected from hydrogen, C$_1$-C$_{20}$-alkyl and a group —[CH$_2$CH$_2$—O—]$_y$R$^c$, wherein y is 1, 2, 3, 4, 5 or 6 and R$^c$ is hydrogen or C$_1$-C$_4$-alkyl; preferably 0, each B independently is C$_2$-C$_6$-alkylene, preferably C$_2$-C$_3$-alkylene; and k is an integer from 1 to 100, preferably 1 to 10 and more preferably 2 to 4; and a group of one of the following formulae

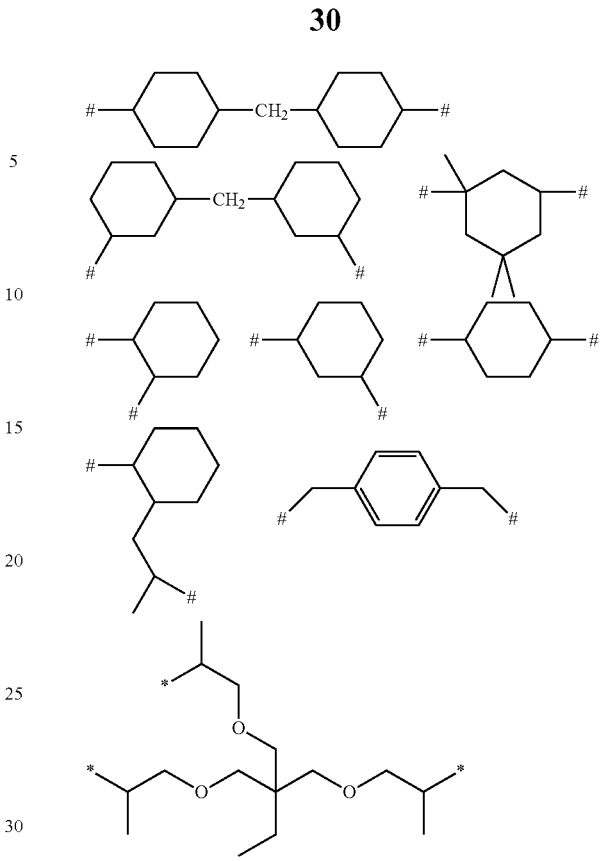

and mixtures thereof.

In a further preferred embodiment, the imidazolium compound comprises repeat units of the formula (IV), wherein A is derived from a mixture of amino compounds by formal elimination of the primary amino groups, comprising at least one amine with two primary amino groups and at least amine with more than two, in particular three, primary amino groups.

In the structural units of the formula IV preferably the anions Y$^{n-}$ are selected from formate, acetate, propionate, butyrate, pentanoate, hexanoate, heptanoate, octanoate, glycolate (hydroxyacetate), adipate, succinate, phthalate, terephthalate, (C$_1$-C$_4$-alcoxy)(CH$_2$CH$_2$O)$_x$CH$_2$COO$^-$ with x being 1-4, benzoate, sulfate, hydrogensulfate, methanesulfonate. Most preferred are bis(sulfonyl)imides like bis(trifluormethanesulfonyl)imides, (hydrogen)sulfate and tosylate.

The polymeric ionic compound comprising imidazolium groups preferably has a weight average molecular weight M$_w$ (determined according to the methods described in the examples of WO 2012/127009: M$_w$ is the weight-average molecular weight as obtained by GPC (gel permeation chromatography/size exclusion chromatography) using 0.02 mol/l formic acid+0.2 mol/l KCl in water as elution agent and pullulan standard (linear polymaltotriose and maltohexose; from PSS, Germany), or using hexafluoroisopropanol+0.05% potassium trifluoroacetate in water as elution agent and PMMA standard of from 300 bis 500000, more preferably of from 500 to 300000, even more preferably of from 1000 to 200000, in particular 2000 to 200000 and specifically 4000 to 200000. The dispersity PDI (M$_w$/M$_n$; M$_n$=number-average molecular weight) is preferably in the range from 1.1 to 20, more preferably from 1.5 to 15.

Preferred polymeric ionic compounds comprising imidazolium groups (imidazolium compounds) are those which contain functional (and) groups capable of linking to a polyamide chain. Thus, the polymeric ionic compound preferably contains at least one end group capable of forming covalent bond with a polyamide. The at least one end group is preferably an amino group capable of forming a linkage to a polyamide chain, specifically a carboxyl group thereof.

Thus, the polymeric ionic compound preferably contains at least one amino group which will form a covalent bond to the polyamide main chain upon mixing and heating to a temperature of 240 to 350° C. for an appropriate time, typically 0.2 to 30 minutes.

Preferred polyimidazolium salts are:
Polybutyl imidazolium TFSI
Polybutyl imidazolium hydrogensulfate
Polybutyl imidazolium acetate
Polybutyl imidazolium tosylate
Polyhexyl imidazolium TFSI
Polyhexyl imidazolium hydrogensulfate
Polyhexyl imidazolium acetate
Polyhexyl imidazolium tosylate
Polydodecyl imidazolium tosylate
Polydodecyl imidazolium TFSI
Polydodecyl imidazolium hydrogensulfate
Polydodecyl imidazolium acetate
Polyxylylene imidazolium tosylate
Polyxylylene imidazolium TFSI
Polyxylylene imidazolium hydrogensulfate
Polyxylylene imidazolium acetate
TFSI is bis(trifluormethanesulfonyl)imide In addition to the at least one polymeric imidazolium compound, the thermoplastic polyamide particles may contain further microbiocidal compounds as e. g. listed on page 42, line 9, to page 44, line 7, of WO 2012/127009.

The thermoplastic polyamide particles contain an amount of the polymeric imidazolium compound that is sufficient to effect an antimicrobial activity. Preferably, the amount of the polymeric imidazolium compound, based on the total thermoplastic polyamide particles including filler, is from 0.01 to 10 wt. %, more preferably 0.1 to 10 wt. %, even more preferably 0.1 to 5 wt. %, most preferably 0.5 to 5 wt. % in particular 1 to 3 wt. %, based on the total weight of the thermoplastic polyamide particles.

The amount of all ingredients of the thermoplastic polyamide particles sums up to 100 wt. %. Thus, if e. g. a high amount of inorganic particulate filler is employed, it may be necessary to restrict the amount of polymeric imidazolium compound so that the total wt. % of the thermoplastic polyamide particles add up to 100 wt. %. The amount of the at least one polyamide is preferably 10 to 58.9 wt. %, more preferably 15 to 49 wt. %, based on the total weight of the thermoplastic polyamide particles. The corresponding amount of filler is preferably 41 to 80 wt. %, more preferably 50 to 80 wt. %, based on the total weight of the thermoplastic polyamide particles.

If one or more of the further additives disclosed above for the polyamide or active agents disclosed below are employed in the thermoplastic polyamide particles, the upper limits for the polyamide content and/or the inorganic particulate filler content are reduced accordingly, so that the sum of all components of the thermoplastic polyamide particles adds up to 100 wt. %.

Further active agents which can be employed in the thermoplastic polyamide particles according to the present invention are disclosed in WO 2012/127009 on page 47, line 24, to page 60, line 22, however, preferably no such additional active agents are employed in the thermoplastic polyamide particles.

The incorporation of the imidazolium compound in the thermoplastic polyamide particles of the invention can be carried out by known methods, such as dry blending in the form of a powder or wet mixing in the form of solutions, dispersions or suspensions for example in an inert solvent, water or oil. The imidazolium compound may be incorporated, for example, before or while molding or also by applying the dissolved or dispersed imidazolium compound (or an additive mixture containing it) to the polymer material or the polymerisable composition, with or without subsequent evaporation of the solvent or the suspension/dispersion agent. It may preferably be added directly into the processing apparatus (e.g. extruders, internal mixers, etc), e.g. as a dry mixture or powder or as solution or dispersion or suspension.

The incorporation can be carried out e.g. in any heatable container equipped with a stirrer, e.g. in a closed apparatus such as a kneader, mixer or stirred vessel. The incorporation is preferably carried out in an extruder or in a kneader. The processing may take place in an inert atmosphere or in the presence of oxygen.

The addition of imidazolium compound (or an additive mixture containing the imidazolium compound) to the polymer substrate can be carried out in all customary mixing machines in which the polymer is melted and mixed, preferably at temperatures in the range of from 240 to 35° C., with the additives. Suitable machines are known to those skilled in the art. They are predominantly mixers, kneaders and extruders.

Processing (mixing) includes extrusion, co-kneading, pultrusion, compression molding, sheet extrusion, thermoforming, injection molding or rotational molding. The process is preferably carried out in an extruder by introducing the additives during processing.

Particularly preferred processing machines are single-screw extruders, contrarotating and corotating twin-screw extruders, rotomolding devices, planetary-gear extruders, ring extruders or cokneaders. It is also possible to use processing machines provided with at least one gas removal compartment to which a vacuum can be applied.

Suitable extruders and kneaders are described, for example, in Handbuch der Kunststoffextrusion, Vol. 1 Grundlagen, Editors F. Hensen, W. Knappe, H. Potente, 1989, pp. 3-7, ISBN:3-446-14339-4 (Vol. 2 Extrusionsanlagen 1986, ISBN 3-446-14329-7).

The imidazolium compound (or an additive mixture containing the imidazolium compound) can also be added to the polymer in the form of a masterbatch ("concentrate") which contains the components in a concentration of, for example, about 1% to about 40% and preferably about 2% to about 20% by weight incorporated in a polymer. The polymer must not necessarily be identical to the polymer where the additives are added finally. In such operations, the polymer can be used in the form of powder, granules, solutions, suspensions or in the form of latices. Incorporation can take place prior to or during the shaping operation, or by applying the dispersed compound to the polymer, with or without subsequent evaporation of the solvent. A further possibility for incorporating the imidazolium compound (or an additive mixture containing the imidazolium compound) into polymer substrates is to add them before, during or directly after the polymerization of the corresponding monomers or prior to crosslinking. In this context the additives of the invention can be added as it is or else in encapsulated form (for example in waxes, oils or polymers).

The incorporation of the polymeric imidazolium compound and preferably the particulate inorganic filler in the polyamide forming the thermoplastic polyamide particles is preferably carried out as follows:

The thermoplastic polyamide particles are produced by extrusion of the ingredients and subsequent shaping, which may be a pelletizing, for example, more particularly an underwater pelletizing.

In this case, first of all, the ingredients of the thermoplastic polyamide particles are mixed with one another.

The sequence in which the components are mixed is arbitrary. Possible, for example, is the production of the molding compounds by the mixing of the starting components in customary mixing apparatus such as screw extruders, preferably twin-screw extruders, Brabender mixers or Banbury mixers, and also kneading apparatuses, with subsequent extrusion. Following the extrusion, the extrudate is cooled and comminuted. The sequence of the mixing components can be varied; accordingly, two or optionally three components may be premixed. It is also possible, though, for all of the components together to be mixed.

In order to obtain extremely homogeneous mixing, intensive comixing is advantageous. For this purpose, generally speaking, average mixing times of 0.2-30 minutes at temperatures of 240-350° C., preferably 245-310° C., are preferred. The mixing is preferably an extrusion. This leads to covalent building of imidazolium compound and polyamide. Following extrusion, the extrudate is generally cooled and comminuted.

The pelletizing, more particularly the underwater pelletizing, leads to the ellipsoidal or approximately ellipsoidal shapes of the invention, with a largest diameter of 2 to 10 mm, preferably 3 to 5 mm. For a description of the pelletizing process, more particularly the underwater pelletizing, reference may be made to WO 2004/080679: In a first step of the process, the polymer melt is pressed from the extruder through a die. An example of the die that can be used is a perforated-plate pelletizing die, such as a circular-arrangement pelletizing die. Pelletizing dies contemplated are generally heated pelletizing dies, such as those with mandrel/peripheral heating, those of heated-channel type, or those of heat exchanger type. Among these, preference is given to heated-channel and heat-exchanger types.

With preference in accordance with the invention, the polymer melt is pressed in a cutting chamber flooded with a liquid coolant. The cutting chamber surrounds the die, as for example the pelletizing die, and the apparatus used to comminute the polymer melt. The size and shape of the cutting chamber may in principle be freely selected, and depends on practical considerations such as the size of the pelletizing die, the geometry of the knives, the amount of coolant to be transported through the cutting chamber, or the throughput of polymer.

The coolant used is generally water. In principle it is possible to use any water which is optically clear, such as filtered river water, demineralized water or well water, for example. Use may also be made, however, of other coolants, such as monohydric or polyhydric alcohols, glycol for example, silicone oils or paraffins.

In accordance with one preferred embodiment, the coolant is employed at atmospheric pressure. The temperature of the coolant in this case is generally from 60 to 95° C. The coolant temperature is preferably in the range from 70 to 95° C., more particularly in the range from 80 to 95° C., such as in the range from 80 to 90° C., for example. According to another preferred embodiment, however, the coolant may also be employed under increased pressure. Thus the coolant may be employed at up to 130° C., as for example under increased pressure at a temperature in the range from 60 to 130° C., preferably 70 to 100° C., more particularly 80 to 98° C.

It may therefore be preferable for the pressure to be up to 10 bar, such as from 1 to 8 bar, for example. For example, the pressure may be in the range from 1 to 4, preferably 1 to 3, more particularly 1 to 2 bar. According to one of the preferred embodiments, the coolant in the cutting chamber is under a pressure of at least 1.1 bar. This is particularly preferable when, for example, the coolant has a low boiling point, as for example when water is used as coolant, and the intention is to operate with a coolant temperature of more than 100° C.

In a second step, the polymer melt is comminuted. For this purpose, cutting apparatus such as rotating knives may be provided. Preference in this case is given to using multi-arm rotating knives. For example, knife heads with 6, 8, 12, 14 or more, as for example up to 50, rotating knives are used (their number need not necessarily be an even number). They are generally mounted such that they rotate in the cutting chamber in front of the die, e.g., in front of the heated die plate. The rotary speeds are situated, for example, in the range from 300 to 5000 revolutions per minute. The setting of the knives may be undertaken manually, pneumatically, or hydraulically, or may take place automatically by spring force. These measures are known to the skilled person.

The periods of time between the discharge of the polymer melt and the comminuting of this melt are generally very small. They amount in accordance with the invention to not more than 20 ms, preferably not more than 10 ms, more particularly not more than 5 ms. Since the temperature of the polymer melt on its discharge from the die is generally in the range from 150 to 350° C., preferably 180 to 320° C., more particularly 200 to 300° C., the temperature of the polymer melt during cutting is generally not more than from 10 to 20° C. below the discharge temperature.

In accordance with the invention, the pellets obtained in the second step are cooled in a third step. The preferred cooling rate here is dependent on the nature of the polymer. In accordance with the invention, the cooling rate is 2 to 30° C./s, preferably in the range from 5 to 20° C./s, more particularly in the range from 8 to 15° C./s. During the cooling step, the ratio by volume of pellets to coolant is generally from 0.03:1 to 0.12:1, preferably from 0.06:1 to 0.1:1. It is generally preferable for the external temperature of the pellets after the third step to be from 100 to 200° C., preferably from 100 to 150° C. This temperature is determined by taking a defined amount of sample, removing the adherent coolant, and measuring the temperature by means of an IR chamber.

It is preferable for the coolant used to cool the pellets to be the same as that into which the polymer melt is pressed and in which it is comminuted. The third step of the process takes place preferably outside the flooded cutting chamber.

While the pellets are cooling, they are preferably transported at the same time to drying apparatus. Heat may be removed from the cooling medium throughout the entire transport section. Alternatively, heat may be removed from the cooling medium only in parts of the transport section. According to one particularly preferred embodiment, no heat is removed from the cooling medium in a first part of the transport section, and heat is removed from the cooling medium in a second part. The length of the first part may be up to 80% of the overall transport section, and its length may be, for example, up to three quarters of that of the overall transport section.

The pellets may be dried, for example, in customary drying apparatus, of the kind described in the expert literature. Examples of suitable drying apparatus are centrifugal dryers or fluidized-bed dryers. Particularly preferred drying apparatus is that in which it is possible concomitantly to utilize the residual heat present in the pellets after the third step, in order to support the drying process.

The thermoplastic polyamide particles of the invention are used in laundering and cleaning processes, preferably in laundering and cleaning processes for the cleaning of textiles.

Suitable laundering and cleaning processes are known per se and are described in, for example, WO 2007/128962, WO 2010/0949959, WO 2011/064581, WO 2011/098815, WO 2010/128337, WO 2012/056252, WO 2012/035342, WO 2012/035343 and WO 2012/095677.

In one preferred laundering and cleaning process, textiles made unclean in the laundering process are cleaned by treatment with thermoplastic polyamide particles of the invention and washing water, the treatment being carried out in apparatus comprising a drum with perforated side walls and a capacity of 5 to 50 l per kg of textiles to be cleaned, the thermoplastic polyamide particles being used in a weight ratio to the textiles in the range of 0.1:1-10:1, and the drum with the perforated side walls being rotated at a speed which leads to the development of g-forces in the range from 0.05 to 900 g.

For a closer description of the process, reference may be made in particular to WO 2012/056252. It is possible more particularly to carry out the process steps indicated in claims 1, 31, and 35 of that patent.

The apparatus suitable for performing the process preferably comprises a rotatable cleaning chamber and a particle storage tank suitable for containing the cleaning particles as defined above.

Preferably the apparatus comprises one or more of the following components:
i. a controller;
ii. a display;
iii. a solenoid valve;
iv. a pneumatic valve.

The apparatus preferably comprises a controller. The controller is preferably configured such that the user can select a desired cleaning cycle and/or desired cleaning conditions and the controller then automatically controls the washing apparatus so as to perform the desired cycle and/or to achieve the desired cleaning conditions. The controller is preferably an electronic controller.

The apparatus preferably comprises a display. The display is preferably an electronic display. Examples of suitable displays include those incorporating liquid crystal and light emitting diode displays. Preferably the display shows information including for example the cleaning cycle and/or cleaning conditions selected by the user on the controller. Preferably, the apparatus comprises a controller and a display.

The apparatus can comprise one or more solenoid valves and/or one or more pneumatic valves. These valves can control, for example, the entry of clean liquid medium into the apparatus, the exit of dirty liquid medium from the apparatus and/or the introduction of optional components in the cleaning composition (such as detergent) to the substrate.

The thermoplastic polyamide particles comprising the polymeric imidazolium compounds show a much increased resistance against microbial attack or contamination. When the polymeric imidazolium compounds are combined with particulate inorganic fillers having a density of at least 2.5 g/cm$^3$, the ellipsoidal or approximately ellipsoidal thermoplastic polyamide particles can easily be administered to and removed from a washing machine or laundry contained in the washing machine. Therefore, it is most preferred to combine the polymeric imidazolium compounds with the particulate inorganic filler in the thermoplastic polyamide particles.

The invention is illustrated by the examples below.

EXAMPLES

1 Raw Materials

Ultramid B27 is a polyamide (PA6) from BASF SE. It has a viscosity number of 150 ml/g.
Polyimidazolium salts are:
  Polybutyl imidazolium TFSI
  Polybutyl imidazolium hydrogensulfate
  Polybutyl imidazolium acetate
  Polybutyl imidazolium tosylate
  Polyhexyl imidazolium TFSI
  Polyhexyl imidazolium hydrogensulfate
  Polyhexyl imidazolium acetate
  Polyhexyl imidazolium tosylate
  Polydodecyl imidazolium tosylate
  Polydodecyl imidazolium TFSI
  Polydodecyl imidazolium hydrogensulfate
  Polydodecyl imidazolium acetate
  Polyxylylene imidazolium tosylate
  Polyxylylene imidazolium TFSI
  Polyxylylene imidazolium hydrogensulfate
  Polyxylylene imidazolium acetate
  TFSI is bis(trifluormethanesulfonyl)imide
Preferred are
  Polybutyl imidazolium TFSI
  Polybutyl imidazolium hydrogensulfate
  Polydodecyl imidazolium tosylate
  Polydodecyl imidazolium TFSI
  Polydodecyl imidazolium hydrogensulfate
  Polyxylylene imidazolium TFSI
Imid. is polybutyl imidazolium TFSI
TFSI is bis(trifluormethanesulfonyl)imide Viscosity numbers were determined in 96% sulfuric acid according to DIN ISO 307.

The polyimidazolium salts were prepared in an analogous manner to example 1 of WO 2010/072571 or the table on pages 162-164 of WO 2012/127009 employing the appropriate (alkylene)diamine and counter ion. They contain on average more than 10 imidazolium groups per molecule.

2 Antimicrobial Activity 2.1 Samples

Ultramid B27 was extruded in a DSM Xplore 15 Micro Compounder at a melt temperature of 260° C., and 1 wt. % or 3 wt. % of antimicrobial additive were admixed in the extruder. It is assumed that covalent bonding of the imidazolium compound to the polyamide main chain took place at these conditions. Subsequently, plaques of size 3×3 cm were injection molded using a DSM Research 10 cm$^3$ laboratory injection molding machine.

Sample Appearance:
light-beige-beige, sample size: 3×3 cm

2.2 Test Method

ISO 22196-2011-08-01 second edition

2.3 Test Microorganism

*Escherichia coli* DSM 1576~ATCC 8739
*Staphylococcus aureus* DSM 346~ATCC 6538P
*Aspergillus niger* DSM 1957

2.4 Test Procedure

In accordance with ISO 22196:2011 microorganisms were inoculated on the sample surface, covered with a regular film, and incubated at 37° C. for 24 hours for bacteria. *Aspergillus niger* (since it is a mold not part of the test method) was incubated at 30° C. for 48 hours. Due to deviant sample size test conditions have been adjusted with regard to cover film size and inoculum volume. Since number of samples was limited, test was done as duplicates instead of triplicates. Afterwards, the number of viable cells of microorganisms was counted. Value of antimicrobial activity of each sample was calculated according to the following formula:

$$R = \log(B/C)$$

R: Value of antimicrobial activity expressed as log-reduction
B: Average of the number of microorganisms on the control samples, i.e. samples without antimicrobial additive after incubation for 24 hours.
C: Number of microorganisms on the antimicrobial treated samples after incubation for 24 hours.

Criteria for Antimicrobial Efficacy:
According to test method JIS Z 2801 (a method very much comparable to ISO 22196) the value of antimicrobial activity R shall not be under 2.0 to judge a product as antimicrobially active. ISO 22196 does not include any minimum requirements for antimicrobial activity.

2.5 Results

TABLE 1 testing against bacteria (1% active concentration)

| Test | Formulation | Active substance | Concentration | Aspect | E. coli DSM 1576 [cfu/cm$^2$] | S. aureus DSM 346 [cfu/cm$^2$] | E. coli DSM 1576 [average] | S. aureus DSM 346 [average] |
|---|---|---|---|---|---|---|---|---|
| 1 | Blank Ultramid B27 0 h | | | light beige AE | 9.0E+04<br>9.3E+04 | 2.1E+04<br>1.8E+04 | | |
| 2 | Blank Ultramid B27 24 h | | | | 9.3E+05<br>1.4E+06 | 9.0E+03<br>6.5E+02 | 1.2E+06 | 4.8E+03 |
| | | | | | | | [log-reduction] | [log-reduction] |
| 3 | Polybutyl imidazolium TFSI | Polyimidazolium salt | 1% | light beige, AE | <1<br><1 | <1<br><1 | >6.1<br>>6.1 | >3.7<br>>3.7 |
| 4 | Polybutyl imidazolium hydrogensulfate | Polyimidazolium salt | 1% | beige | <1<br><1 | <1<br><1 | >6.1<br>>6.1 | >3.7<br>>3.7 |
| 5 | Polydodecyl imidazolium tosylate | Polyimidazolium salt | 1% | light beige | <1<br><1 | <1<br><1 | >6.1<br>>6.1 | >3.7<br>>3.7 |
| 6 | Polydodecyl imidazolium TFSI | Polyimidazolium salt | 1% | beige | 1.3E+04<br>3.5E+04 | <1<br><1 | 2.0<br>1.6 | >3.7<br>>3.7 |
| 7 | Polydodecyl imidazolium hydrogensulfate | Polyimidazolium salt | 1% | light beige | <1<br><1 | <1<br>2.5E+02 | >6.1<br>>6.1 | >3.7<br>1.3 |
| 8 | Polyxylylene imidazolium TFSI | Polyimidazolium salt | 1% | beige | 23<br><1 | <1<br><1 | 4.7<br>>6.1 | >3.7<br>>3.7 |

TABLE 2 testing against bacteria (3% active concentration)

| Test | Formulation | Active substance | Concentration | Aspect | E. coli DSM 1576 [cfu/cm$^2$] | S. aureus DSM 346 [cfu/cm$^2$] | E. coli DSM 1576 [average] | S. aureus DSM 346 [average] |
|---|---|---|---|---|---|---|---|---|
| 1 | Blank Ultramid B27 0 h | | | light beige AE | 2.8E+04 | 1.8E+04 | | |
| 2 | Blank Ultramid B27 24 h | | | | 3.1E+05 | 1.9E+04 | 3.1E+05 | 1.9E+04 |
| | | | | | | | [log-reduction] | [log-reduction] |
| 3 | Polydodecyl imidazolium TFSI | Polyimidazolium salt | 3% | beige | <1<br><1 | not tested | >5.5<br>>5.5 | not tested |

TABLE 2-continued testing against bacteria (3% active concentration)

| Test | Formulation | Active substance | Concentration | Aspect | E. coli DSM 1576 [cfu/cm$^2$] | S. aureus DSM 346 [cfu/cm$^2$] | E. coli DSM 1576 [average] | S. aureus DSM 346 [average] |
|---|---|---|---|---|---|---|---|---|
| 4 | Polydodecyl imidazolium hydrogensulfate | Polyimidazolium salt | 3% | light beige | not tested | <1<br><1 |  | >4.3<br>>4.3 |

TABLE 3 testing against fungus (1% active concentration)

| Test | Formulation | Active substance | Concentration | Aspect | A. niger DSM 1957 [cfu/cm$^2$] | A. niger DSM 1957 [average] |
|---|---|---|---|---|---|---|
| 1 | Blank Ultramid B27 0 h |  |  | light beige AE | 1.1E+04<br>1.3E+04 | 1.2E+04 |
| 2 | Blank Ultramid B27 24 h |  |  |  | 1.0E+04<br>5.0E+03 | 7.5E+03 |
|  |  |  |  |  |  | [log-reduction] |
| 3 | Polybutyl imidazolium TFSI | Polyimidazolium salt | 1% | light beige, AE | 1.3E025 | 1.8<br>3.2 |
| 4 | Polybutyl imidazolium hydrogensulfate | Polyimidazolium salt | 1% | beige | 2.8E+03<br>5.8E+03 | <1<br><1 |
| 5 | Polydodecyl imidazolium tosylate | Polyimidazolium salt | 1% | light beige | 1.0E+04<br>8.8E+03 | <1<br><1 |
| 6 | Polydodecyl imidazolium TFSI | Polyimidazolium salt | 1% | beige | 7.3E+03<br>8.0E+03 | <1<br><1 |
| 7 | Polydodecyl imidazolium hydrogensulfate | Polyimidazolium salt | 1% | light beige | 6.0E+03<br>8.0E+03 | <1<br><1 |
| 8 | Polyxylylene imidazolium TFSI | Polyimidazolium salt | 1% | beige | 4.8E+03<br>8.8E+03 | <1<br><1 |

TABLE 4 testing against fungus (3% active concentration)

| Test | Formulation | Active substance | Concentration | Aspect | A. niger DSM 1957 [cfu/cm$^2$] | A. niger DSM 1957 [average] |
|---|---|---|---|---|---|---|
| 1 | Blank Ultramid B27 0 h |  |  | light beige AE | 9.9E+03<br>2.0E+04 | 1.5E+04 |
| 2 | Blank Ultramid B27 24 h |  |  |  | 1.8E+04<br>6.0E+03 | 1.2E+04 |
|  |  |  |  |  |  | [log-reduction] |
| 3 | Polybutyl imidazolium TFSI | Polyimidazolium salt | 3% | light beige, AE | <1<br><1 | >4.1<br>>4.1 |
| 4 | Polybutyl imidazolium hydrogensulfate | Polyimidazolium salt | 3% | beige | 3.8E+03<br>7.0E+03 | <1<br><1 |
| 5 | Polydodecyl imidazolium tosylate | Polyimidazolium salt | 3% | light beige | 1.3E+04<br>5.5E+03 | <1<br><1 |
| 6 | Polydodecyl imidazolium TFSI | Polyimidazolium salt | 3% | beige | 3.0E+03<br>9.0E+03 | <1<br><1 |

TABLE 4-continued testing against fungus (3% active concentration)

| Test | Formulation | Active substance | Concentration | Aspect | A. niger DSM 1957 [cfu/cm$^2$] | A. niger DSM 1957 [average] |
|---|---|---|---|---|---|---|
| 7 | Polydodecyl imidazolium hydrogensulfate | Polyimidazolium salt | 3% | light beige | 6.5E+03<br>9.0E+03 | <1<br><1 |
| 8 | Polyxylylene imidazolium TFSI | Polyimidazolium salt | 3% | beige | 4.8E+03<br>2.0E+03 | <1<br><1 |

2.6 Conclusion

Most of the actives incorporated into the polyamide exhibited already at 1% an excellent antibacterial performance against both test bacteria. Those who didn't showed excellent performance at 3% loading.

Antifungal activity was observed for the polyamide samples containing polybutyl imidazolium TFSI or polyhexyl imidazolium acetate.

The same effects are to be expected when the polyamide additionally contains a particulate inorganic filler as described above.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Thermoplastic polyamide particles comprising a mixture of at least one polyamide and at least one polymeric ionic compound comprising imidazolium groups (imidazolium compound), the thermoplastic polyamide particles having an ellipsoidal shape with the largest diameter of 1 to 100 mm, further comprising at least one particulate inorganic filler having a density of at least 2.5 g/cm$^3$, the thermoplastic polyamide particles having a density of at least 1.65 g/cm$^3$, and wherein the amount of particulate inorganic fillers, based on the thermoplastic polyamide particles, is 50 to 80 wt %, wherein an ellipsoidal shape is characterized by the diameter of the ellipsoid at any, arbitrarily selected position of the ellipsoid deviating by not more than 20% from the corresponding diameter of an ideal ellipsoid, wherein the polymeric ionic compound contains at least one end group capable of forming a covalent bond with the polyamide and wherein from mixing and heating of polymeric imidazolium compound and polyamide, a covalent bond or linkage between polymeric imidazolium compound and polyamide main chain is formed.

2. The thermoplastic polyamide particles according to claim 1, wherein the polymeric ionic compound comprising imidazolium groups (imidazolium compound) is obtained by reacting
   a) at least one α-dicarbonyl compound,
   b) at least one aldehyde,
   c) at least one amino compound having at least two primary amino groups,
   d) optionally an amino compound having only one primary amino group and
   e) at least one protic acid,
   and optionally subjecting the reaction product to an anion exchange,
   wherein the components a) and b) the aldehyde carbonyl groups may also be present as hemiacetal or acetal and the ketone carbonyl groups may also be present as hemiketal or ketal.

3. The thermoplastic polyamide particles according to claim 2, wherein the main chain of the at least one imidazolium compound apart from the nitrogen atoms of the imidazolium groups does not contain any quaternary nitrogen atoms that bear 4 residues that are different from hydrogen.

4. The thermoplastic polyamide particles according to claim 2, wherein component c) is selected from $$\text{amines of the formula 1 } H_2N\text{-A-}NH_2 \quad (1)$$

wherein
A is a divalent aliphatic, alicyclic, aliphatic-alicyclic, aromatic or araliphatic radical, where the aliphatic moieties in the aforementioned aliphatic, aliphatic-alicyclic or araliphatic radicals may be interrupted by one or more nonadjacent groups which are selected from —O—, —S— and —N(R$^b$)—, where R$^b$ is selected from hydrogen, C$_1$-C$_{20}$-alkyl and a group $\text{\textendash}(CH_2CH_2\text{—}O\text{\textendash})_y$—R$^c$, wherein y is 1, 2, 3, 4, 5 or 6 and R$^c$ is hydrogen or C$_1$-C$_4$-alkyl; where alicyclic or aromatic moieties in the aforementioned alicyclic, aliphatic-alicyclic, aromatic or araliphatic radicals may be substituted by 1, 2, 3 or 4 radicals selected from $C_1$-$C_{20}$-alkyl, $C_1$-$C_{20}$-alkoxy, a radical of the formula —O—[CH$_2$CH$_2$O]$_z$—R$^d$, where R$^d$ is hydrogen or $C_1$-$C_4$-alkyl and z is 1, 2, 3, 4, 5 or 6; carboxyl and carboxylate, and where the aliphatic moieties in the aforementioned aliphatic, aliphatic-alicyclic or araliphatic radicals may be substituted by 1, 2, 3 or 4 radicals selected from $C_1$-$C_{20}$-alkoxy, a radical of the formula —O—[CH$_2$CH$_2$O]$_z$—R$^d$, where R$^d$ is hydrogen or $C_1$-$C_4$-alkyl and z is 1, 2, 3, 4, 5 or 6, carboxyl and carboxylate; with the proviso that the aromatic or araliphatic radicals preferably do not contain 1,4-bound phenylene rings;

amines of the formula 2

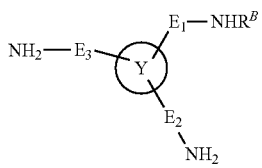 (2)

in which

Y is CR$^C$, N, $C_2$-$C_6$-alkyl or $C_3$-$C_6$-cycloalkyl;

$E_1$, $E_2$ and $E_3$, independently of each other, are a single bond, $C_1$-$C_{10}$-alkylene, —NR$^D$—$C_2$-$C_{10}$-alkylene or —O—$C_1$-$C_{10}$-alkylene, with the proviso that $E_1$, $E_2$ and $E_3$ are not a single bond and are not —NR$^D$—$C_2$-$C_{10}$-alkylene when Y is N;

R$^C$ is H, $C_1$-$C_4$-alkyl, $C_2$-$C_4$-hydroxyalkyl or $C_1$-$C_4$-alkoxy; and R$^B$ and R$^D$, independently of each other, are H, $C_1$-$C_4$-alkyl, $C_2$-$C_4$-hydroxyalkyl or $C_1$-$C_4$-alkoxy; and mixtures thereof and/or wherein component c) is selected from nitrogen-comprising polymers.

5. The thermoplastic polyamide particles according to claim 4, wherein the divalent aliphatic radicals A are selected from linear and branched $C_1$-$C_{30}$-alkylene which may be interrupted by one or more nonadjacent groups which are selected from —O—, —S— and —N(R$^b$)—, where R$^b$ is selected from hydrogen, $C_1$-$C_{20}$-alkyl and a group —[CH$_2$CH$_2$—O—]$_y$—R$^c$, wherein y is 1, 2, 3, 4, 5 or 6 and R$^c$ is hydrogen or $C_1$-$C_4$-alkyl; and/or may be substituted by 1, 2, 3 or 4 radicals selected from $C_1$-$C_{20}$-alkoxy, a radical of the formula —O—[CH$_2$CH$_2$O]$_z$—R$^d$, where R$^d$ is hydrogen or $C_1$-$C_4$-alkyl and z is 1, 2, 3, 4, 5 or 6, carboxyl and carboxylate;

the divalent alicyclic radicals A are selected from $C_5$-$C_8$-cycloalkylene which may carry 1, 2, 3 or 4 $C_1$-$C_4$-alkyl radicals;

the divalent aliphatic-alicyclic radicals A are selected from $C_1$-$C_4$-alkylene-$C_5$-$C_8$-cycloalkylene, $C_5$-$C_8$-cycloalkylene-$C_1$-$C_4$-alkylene-$C_5$-$C_8$-cycloalkylene and $C_1$-$C_4$-alkylene-$C_5$-$C_8$-cycloalkylene-$C_1$-$C_4$-alkylene, with the cycloalkylene radicals possibly carrying 1, 2, 3 or 4 $C_1$-$C_4$-alkyl radicals;

the divalent aromatic radicals A are selected from 1,2-phenylene, 1,3-phenylene, naphthylene and biphenylene, with the phenylene radicals possibly carrying 1, 2, 3 or 4 radicals selected from $C_1$-$C_{20}$-alkyl, $C_1$-$C_{20}$-alkoxy and a radical of the formula —O—[CH$_2$CH$_2$O]$_z$—R$^d$, where R$^d$ is hydrogen or $C_1$-$C_4$-alkyl and z is 1, 2, 3, 4, 5 or 6; and the divalent araliphatic radicals A are selected from phenylene-$C_1$-$C_4$-alkylene, phenylene-$C_1$-$C_4$-alkylene-phenylene and $C_1$-$C_4$-alkylene-phenylene-$C_1$-$C_4$-alkylene, with the phenylene radicals possibly carrying 1, 2, 3 or 4 radicals selected from $C_1$-$C_{20}$-alkyl, $C_1$-$C_{20}$-alkoxy and a radical of the formula —O—[CH$_2$CH$_2$O]$_z$—R$^d$, where R$^d$ is hydrogen or $C_1$-$C_4$-alkyl and z is 1, 2, 3, 4, 5 or 6.

6. The thermoplastic polyamide particles according to claim 4, wherein component c) is selected from compounds of the formula $H_2N$—$(CH_2)_m$—$NH_2$, wherein m is an integer of 3 to 20, where a $CH_2$ group may be substituted by a carboxyl or carboxylate group;

compounds of the formula $NH_2[B-X]_k$—B—$NH_2$; in which X is O, each B independently is $C_2$-$C_6$-alkylene; and k is an integer from 1 to 100;

bis(4-aminocyclohexyl)methane, bis(3-aminocyclohexyl)methane, isophoronediamine, 1,1-bis(aminomethyl)cyclohexane, 1,2-bis(aminomethyl)cyclohexane, 1,3-bis(aminomethyl)cyclohexane, 1,4-bis(aminomethyl)cyclohexane, 2-aminopropylcyclohexylamine, 3(4)-aminomethyl-1-methylcyclohexylamine;

3-aminomethyl-benzylamine;

amines of the formula 2, wherein Y is CR$^C$, where R$^C$ is H or $C_1$-$C_4$-alkyl, and $E_1$, $E_2$ and $E_3$, independently of each other, are —O—$C_1$-$C_6$-alkylene; and mixtures thereof, or wherein component c) is a mixture of amino compounds, comprising at least one amine with two primary amino groups and at least one amine with more than two, in particular three, primary amino groups.

7. The thermoplastic polyamide particles according to claim 1, wherein the anions of the at least one protic acid e) and/or the anions of the imidazolium compound are selected from:

the group of chloride, bromide and iodide, the group of carboxylates and polybasic carboxylic acids, the group of sulfates, sulfites and sulfonates, and the group of phosphates.

8. The thermoplastic polyamide particles according to claim 1, wherein the end group of the polymeric ionic compound is an amino group.

9. The thermoplastic polyamide particles according to claim 1, wherein the thermoplastic polyamide particles have a density of at least 1.9 g/cm$^3$.

10. The thermoplastic polyamide particles according to claim 9, wherein the particulate inorganic filler is selected from metals, metal oxides, metal salts, and mixtures thereof.

11. A method for producing thermoplastic polyamide particles according to claim 1 by mixing the ingredients and subsequently shaping.

12. The method according to claim 11, wherein the shaping is a pelletizing.

13. The method according to claim 11, wherein the mixing is extruding.

14. The method according to claim 11, wherein the mixing is at a temperature in the range of 240 to 350° C.

15. The method according to claim 12, wherein the pelletizing is a water pelletizing.

* * * * *